(12) United States Patent
Shinzato

(10) Patent No.: US 11,714,260 B2
(45) Date of Patent: Aug. 1, 2023

(54) OPTICAL SYSTEM, LENS APPARATUS, AND IMAGE PICKUP APPARATUS

(71) Applicant: CANON KABUSHIKI KAISHA, Tokyo (JP)

(72) Inventor: Yuki Shinzato, Tochigi (JP)

(73) Assignee: CANON KABUSHIKI KAISHA, Tokyo (JP)

(*) Notice: Subject to any disclaimer, the term of this patent is extended or adjusted under 35 U.S.C. 154(b) by 122 days.

(21) Appl. No.: 17/372,301

(22) Filed: Jul. 9, 2021

(65) Prior Publication Data

US 2022/0019061 A1  Jan. 20, 2022

(30) Foreign Application Priority Data

Jul. 20, 2020 (JP) .................... 2020-123366

(51) Int. Cl.
 *G02B 9/10* (2006.01)
 *G02B 13/18* (2006.01)
(52) U.S. Cl.
 CPC .............. *G02B 9/10* (2013.01); *G02B 13/18* (2013.01)
(58) Field of Classification Search
 CPC .................. G02B 9/10; G02B 13/18
 See application file for complete search history.

(56) References Cited

U.S. PATENT DOCUMENTS

| | | | | |
|---|---|---|---|---|
| 2019/0113711 A1* | 4/2019 | Okuoka | ................ | H04N 23/67 |
| 2020/0003991 A1* | 1/2020 | Okada | .................... | G02B 13/02 |
| 2021/0247596 A1* | 8/2021 | Masugi | .................. | G02B 15/22 |

FOREIGN PATENT DOCUMENTS

| | | | |
|---|---|---|---|
| CN | 104423023 A | | 3/2015 |
| CN | 106597647 A | | 4/2017 |
| CN | 109491045 A | | 3/2019 |
| CN | 110687666 A | | 1/2020 |
| JP | 2013137377 A | * | 7/2013 |
| JP | 2017-161848 A | | 9/2017 |
| JP | 2019-074632 A | | 5/2019 |

* cited by examiner

*Primary Examiner* — George G. King
(74) *Attorney, Agent, or Firm* — Canon U.S.A., Inc. IP Division

(57) ABSTRACT

An optical system includes, in order from an object side to an image side, a front unit having a positive refractive power and including one or more lens units configured to move during focusing, and a negative lens unit having a negative refractive power. The one or more lens units included in the front unit moves to the object side during focusing from infinity to a short distance so as to widen a distance between the front unit and the negative lens unit. The front unit includes a first subunit having a negative refractive power and including a lens disposed on the object side of a first positive lens that is one of positive lenses included in the optical system, which is the closest to an object. A predetermined condition is satisfied.

20 Claims, 13 Drawing Sheets

OPTICAL SYSTEM, LENS APPARATUS, AND IMAGE PICKUP APPARATUS

BACKGROUND OF THE DISCLOSURE

Field of the Disclosure

The aspect of the embodiments relates to an optical system suitable for a digital video camera, a digital still camera, a broadcasting camera, a film-based camera, and a surveillance camera.

Description of the Related Art

Due to the recent increased number of pixels in image sensors such as CCD and CMOS sensors, an optical system for an image pickup apparatus that includes the image sensor has been demanded to exhibit a high optical performance. Japanese Patent Laid-Open No. ("JP") 2019-74632 discloses a front focus type optical system that acquires an in-focus state by moving an object-side lens unit to the object, in order to suppress fluctuations of various aberrations associated with focusing. JP 2017-161848 discloses an optical system that includes a meniscus lens having a negative refractive power and an aspherical surface closest to the object, in order to satisfactorily correct off-axis aberrations such as a curvature of field and a distortion.

In an attempt to promote the wide-angle scheme of the optical system disclosed in JP 2019-74632, the off-axis aberrations increase as the angle of view becomes higher. In order to satisfactorily correct the increased off-axis aberrations, a lens having a large diameter is provided to an object-side part in the front unit that serves as the focus unit, making larger the optical system. Since the focus unit also becomes heavier, a high output actuator is required for autofocusing and thus the actuator may become larger.

The optical system disclosed in JP 2017-161848 can satisfactorily correct various aberrations without causing the front unit of the optical system to be larger even when the wide-angle scheme is promoted. However, this optical system requires an aspherical lens to be disposed at a position where the height of the off-axis ray from the optical axis is high and the aspherical lens necessarily has a large manufacturing sensitivity, making it difficult to manufacture the optical system.

SUMMARY OF THE DISCLOSURE

An optical system according to one aspect of the embodiments includes, in order from an object side to an image side, a front unit having a positive refractive power and including one or more lens units configured to move during focusing, and a negative lens unit having a negative refractive power. The one or more lens units included in the front unit moves to the object side during focusing from infinity to a short distance so as to widen a distance between the front unit and the negative lens unit. The front unit includes a first subunit having a negative refractive power and including a lens disposed on the object side of a first positive lens that is one of positive lenses included in the optical system, which is the closest to an object. The following inequalities are satisfied:

$-4.00 < fFL1/x < -0.95$ $1.40 < Nave < 1.65$ $0.25 < BF/f < 0.95$ $0.13 < x/TTL < 0.35$ where f is a focal length of the optical system in an in-focus state at infinity, fFL1 is a focal length of the first subunit, Nave is an average refractive index of the first subunit, x is a distance on an optical axis from a surface on the image side of a lens closest to the object in the optical system in the in-focus state at infinity to a surface on the object side of the first positive lens, TTL is a distance on the optical axis from a lens surface closest to the object in the optical system in the in-focus state at infinity to an image plane, and BF is a backfocus of the optical system in the in-focus state at infinity.

A lens apparatus and an image pickup apparatus each having the above optical system also constitute another aspect of the embodiments.

Further features of the disclosure will become apparent from the following description of exemplary embodiments with reference to the attached drawings.

DESCRIPTION OF THE EMBODIMENTS

Figure 1:
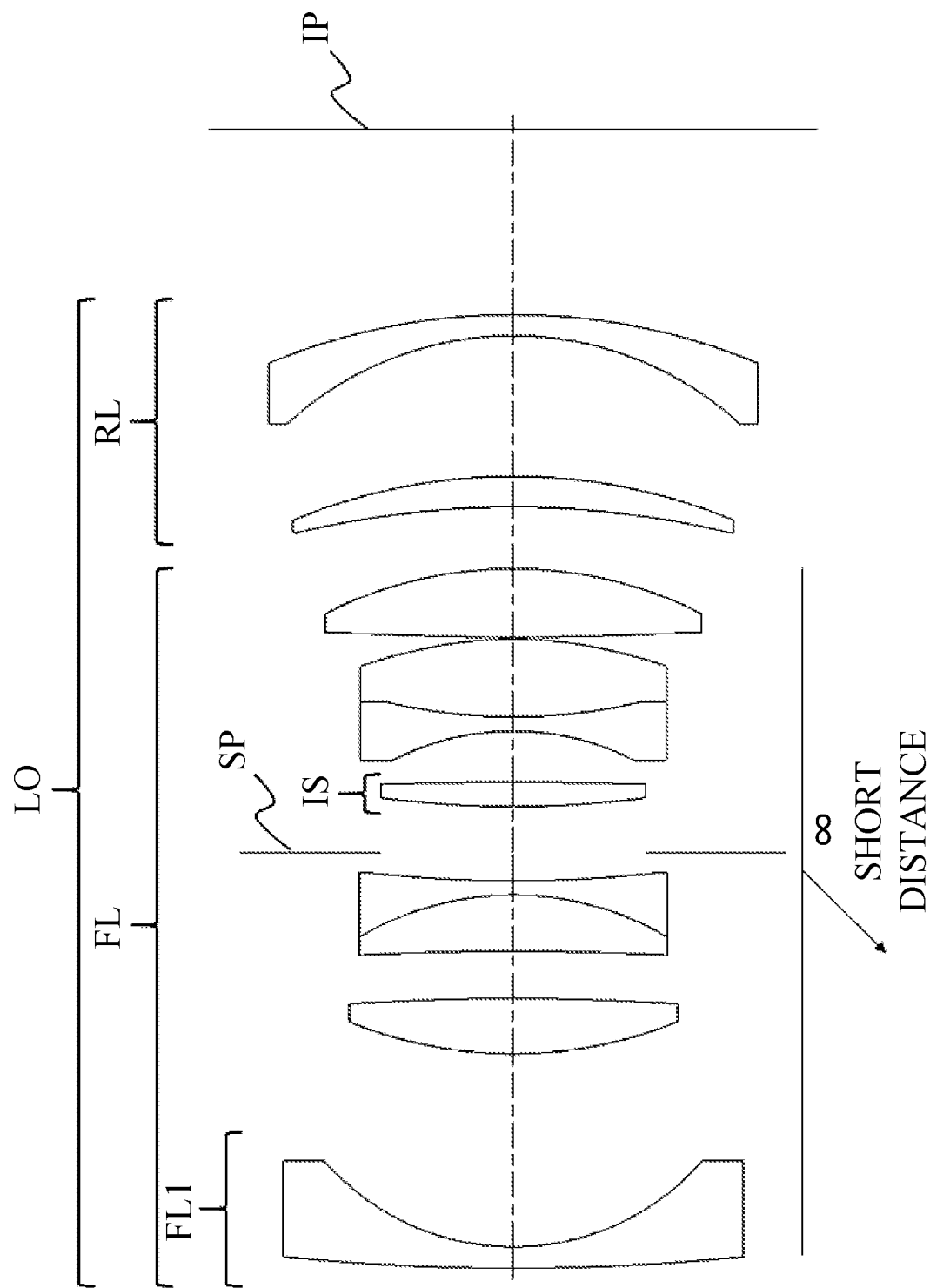
FIG. 1 is a sectional view of an optical system according to Example 1 in an in-focus state at infinity.
Figure 2A:
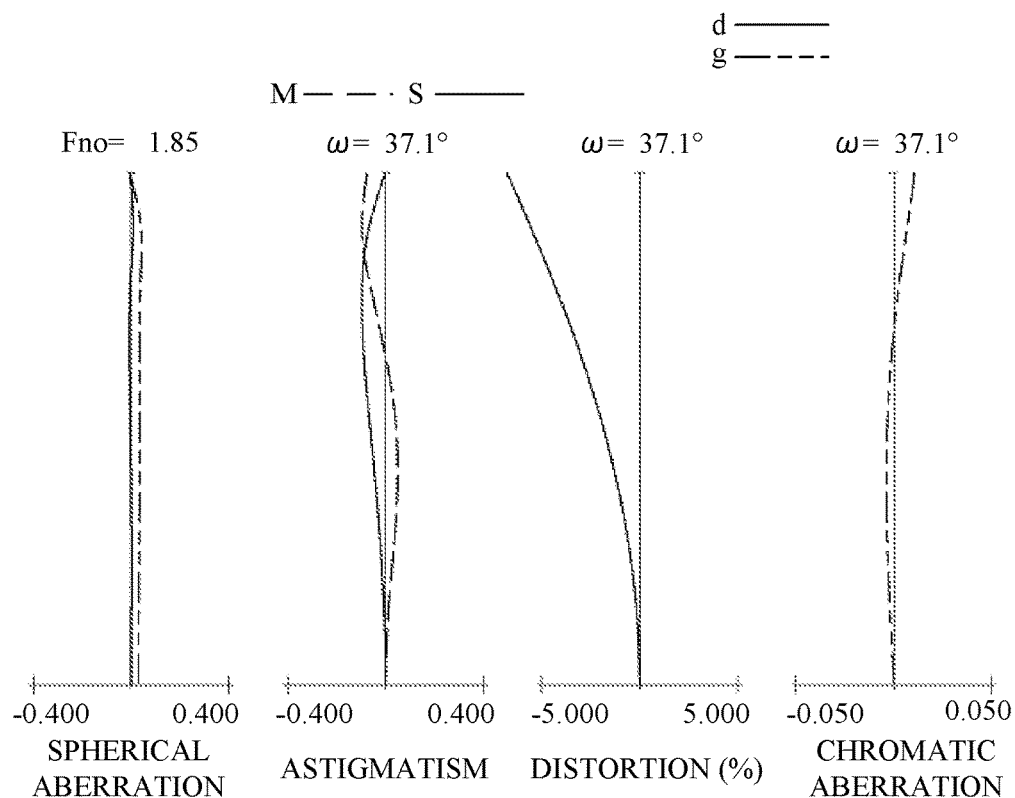
FIGS. 2A and 2B are aberration diagrams of the optical system according to Example 1 in the in-focus states at infinity and at an object distance with a lateral magnification of −0.5 times.
Figure 2B:
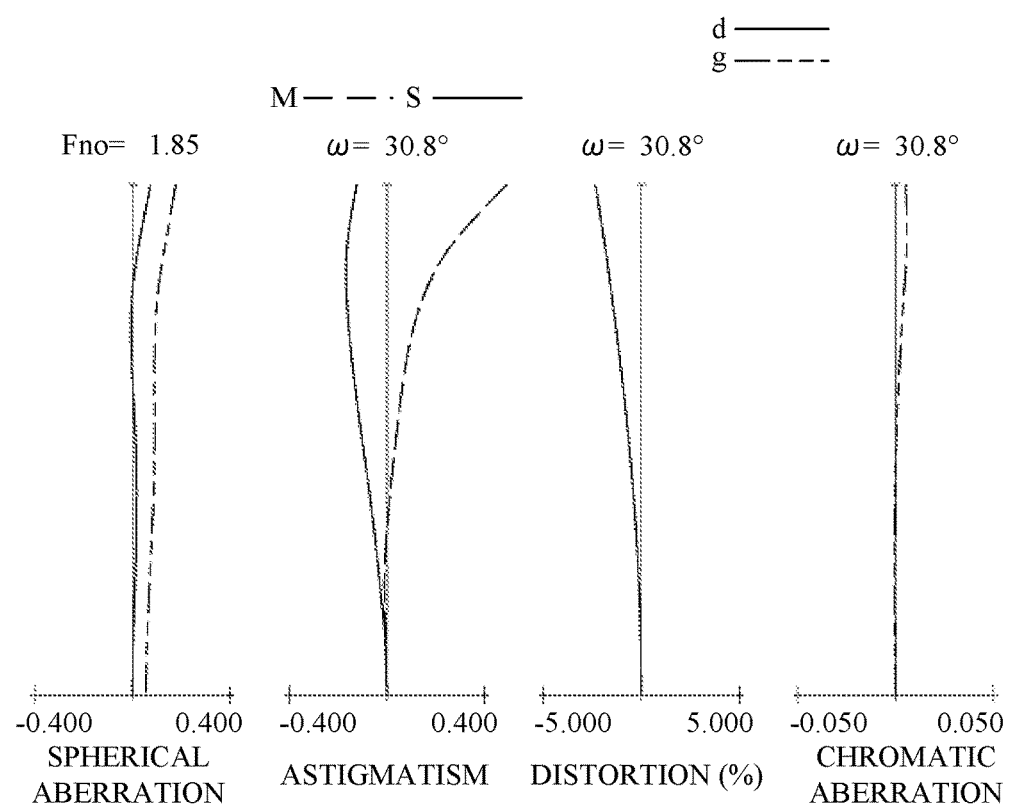
Figure 3:
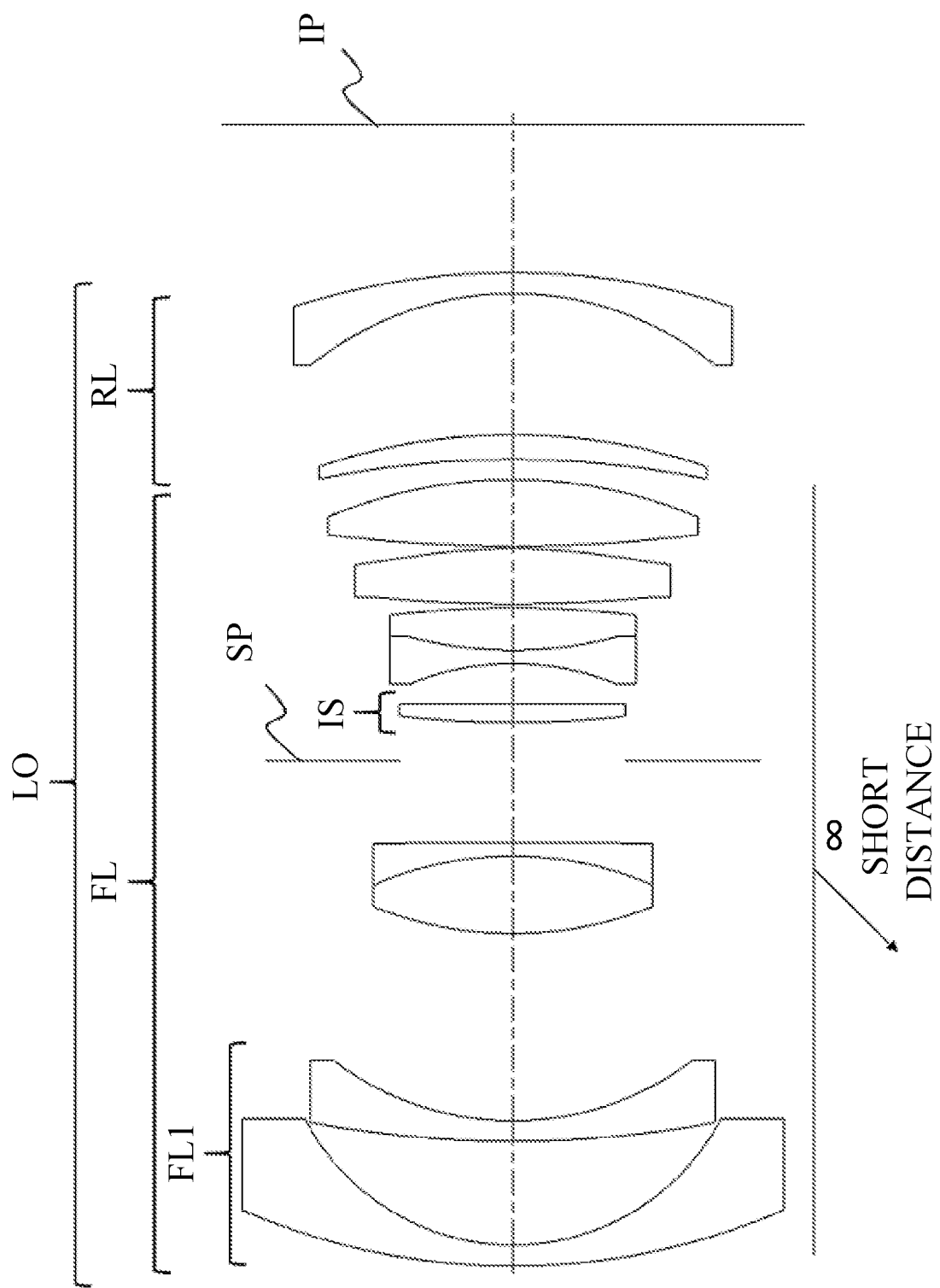
FIG. 3 is a sectional view of an optical system according to Example 2 in an in-focus state at infinity.
Figure 4A:
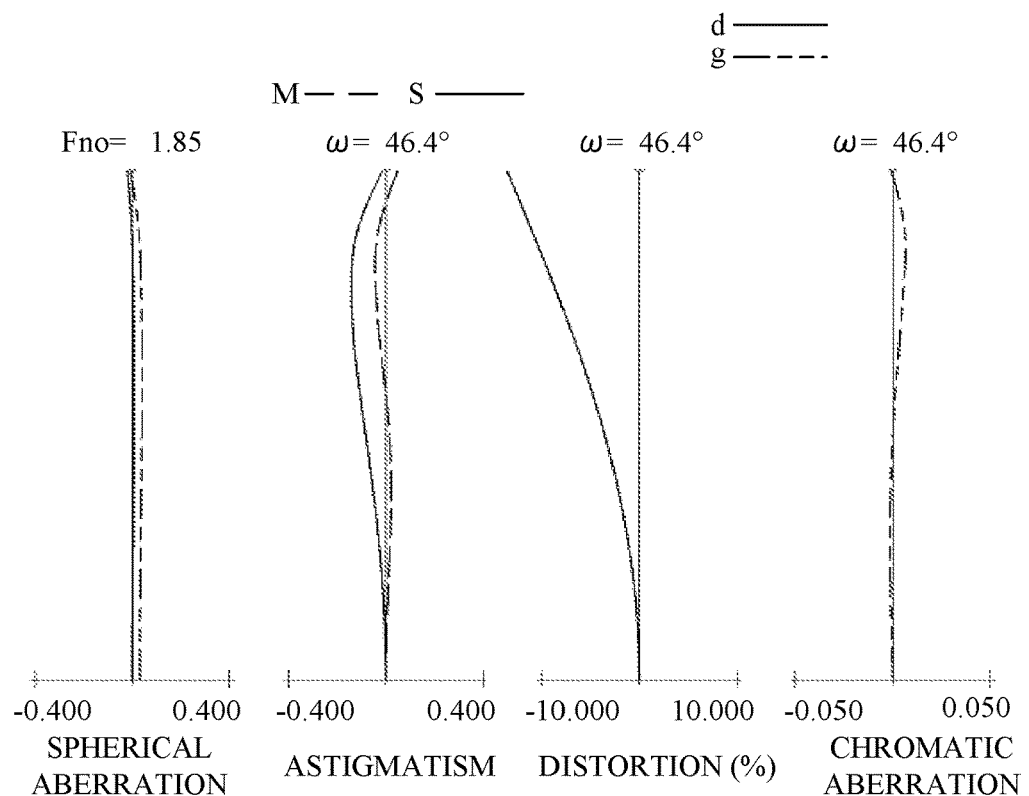
FIGS. 4A and 4B are aberration diagrams of the optical system according to Example 2 in the in-focus states at infinity and at an object distance with a lateral magnification of −0.5 times.
Figure 4B:
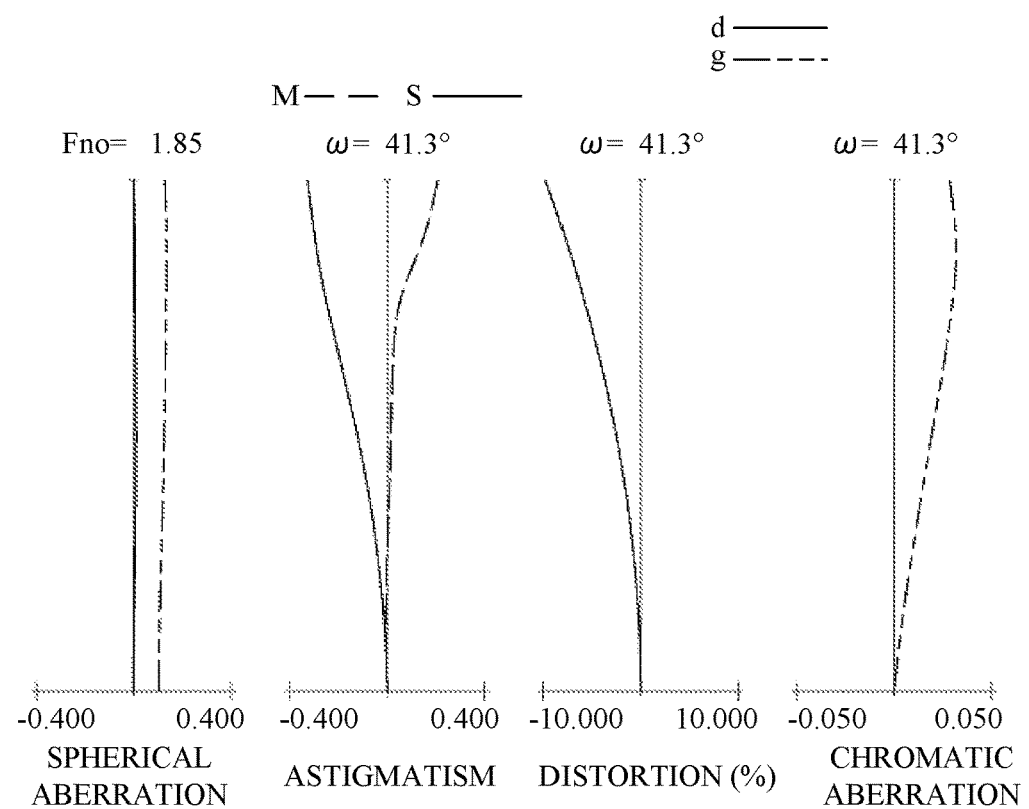
Figure 5:
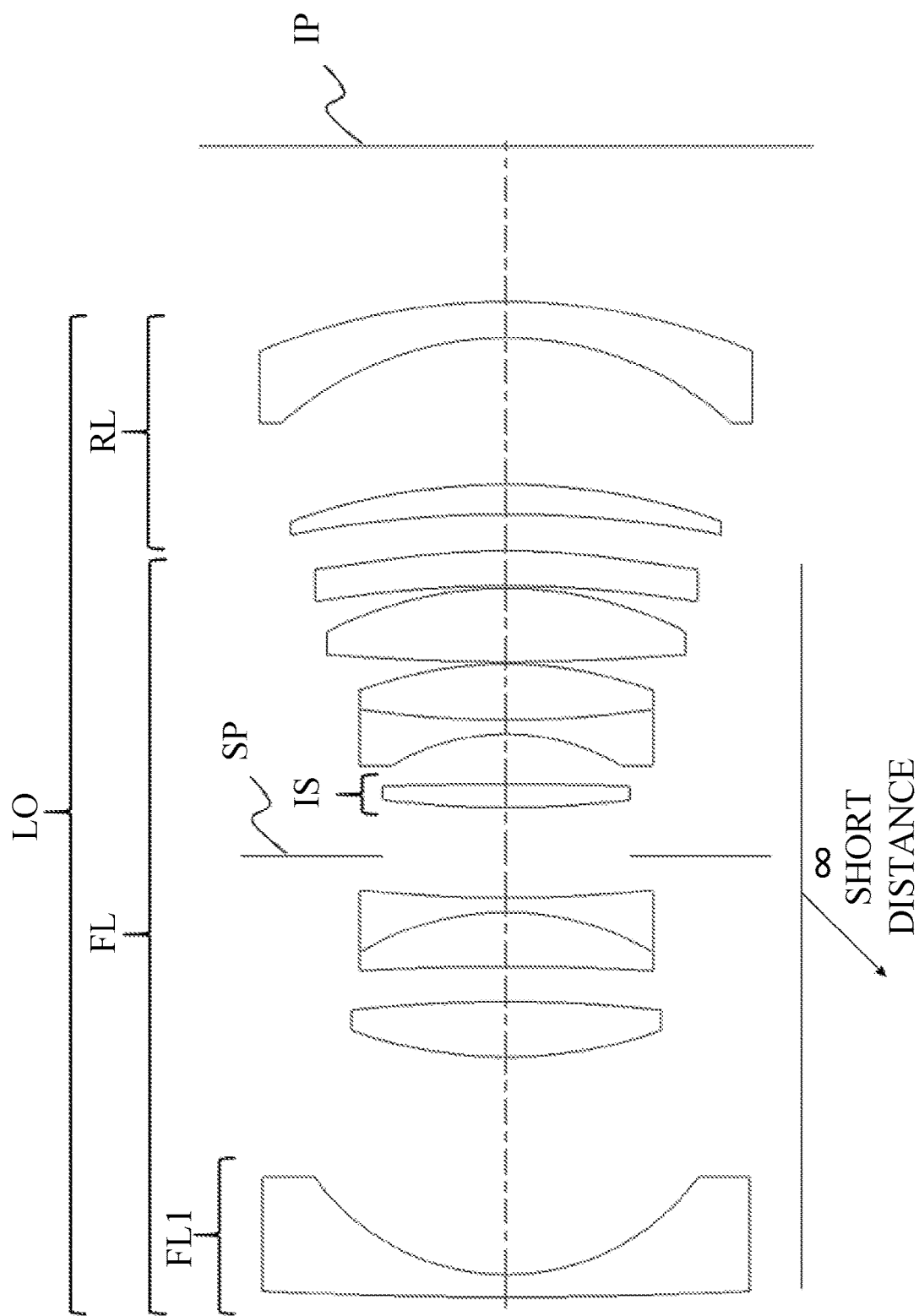
FIG. 5 is a sectional view of an optical system according to Example 3 in an in-focus state at infinity.
Figure 6A:
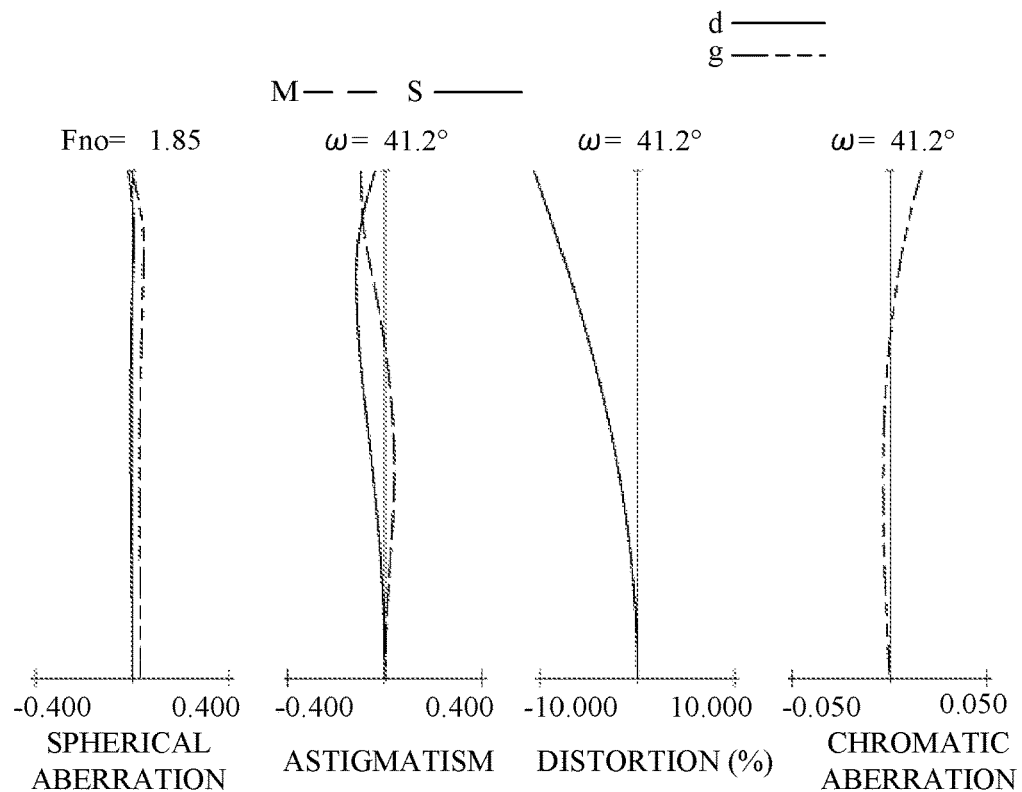
FIGS. 6A and 6B are aberration diagrams of the optical system according to Example 3 in the in-focus states at infinity and at an object distance with a lateral magnification of −0.5 times.
Figure 6B:
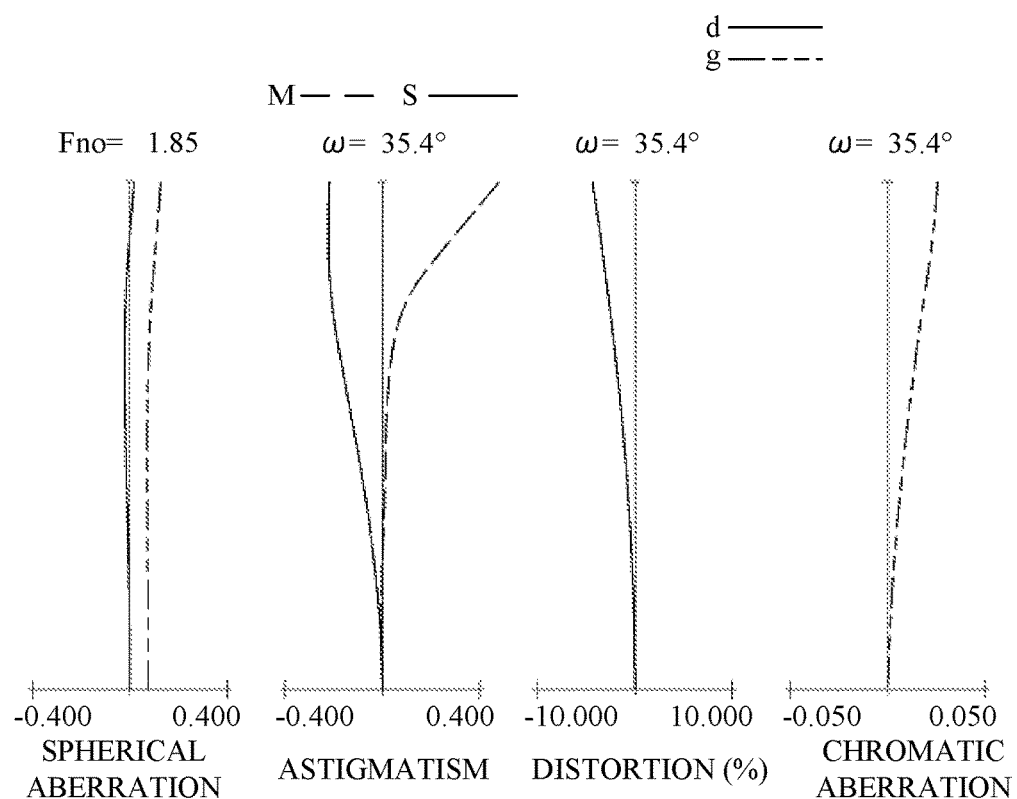
Figure 7:
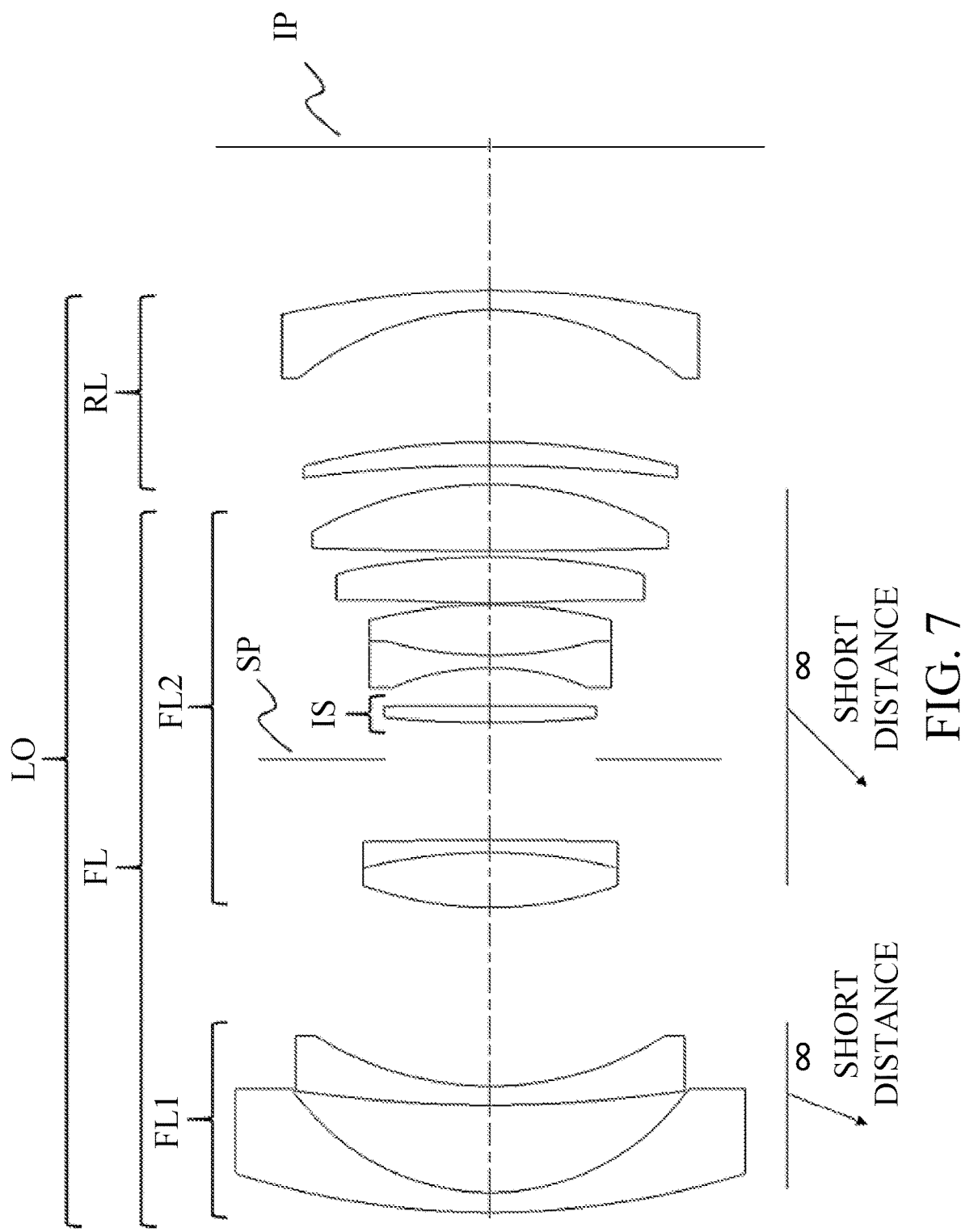
FIG. 7 is a sectional view of an optical system according to Example 4 in an in-focus state at infinity.
Figure 8A:
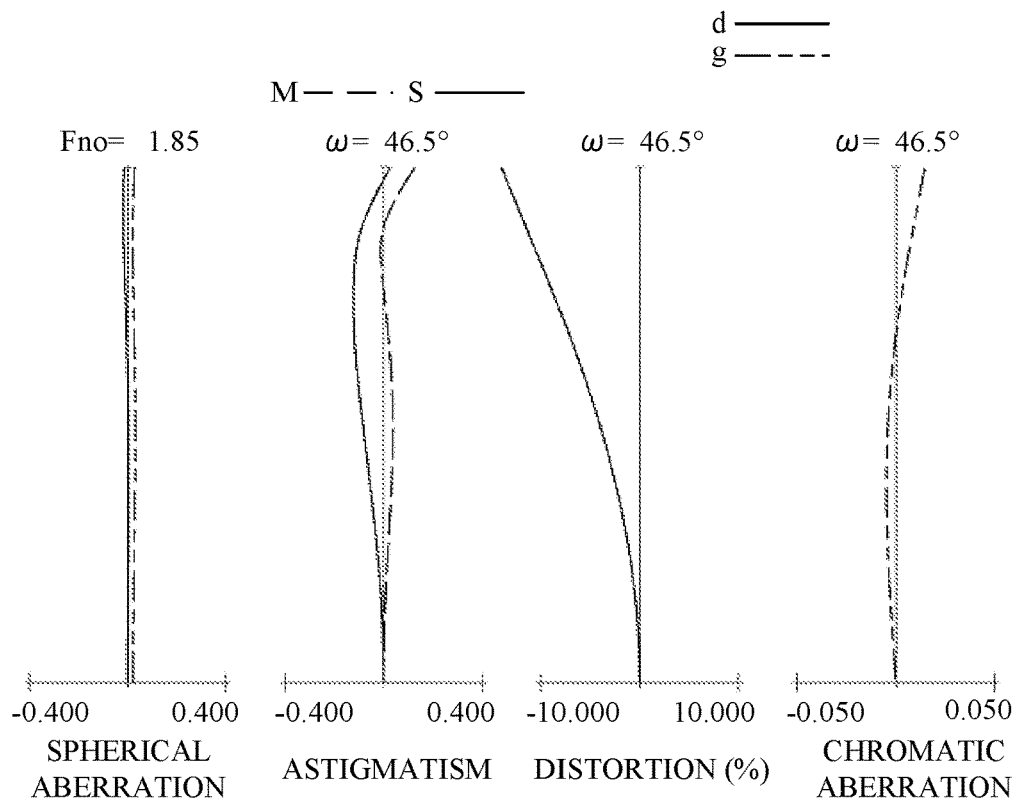
FIGS. 8A and 8B are aberration diagrams of the optical system according to Example 4 in the in-focus states at infinity and at an object distance with a lateral magnification of −0.5 times.
Figure 8B:
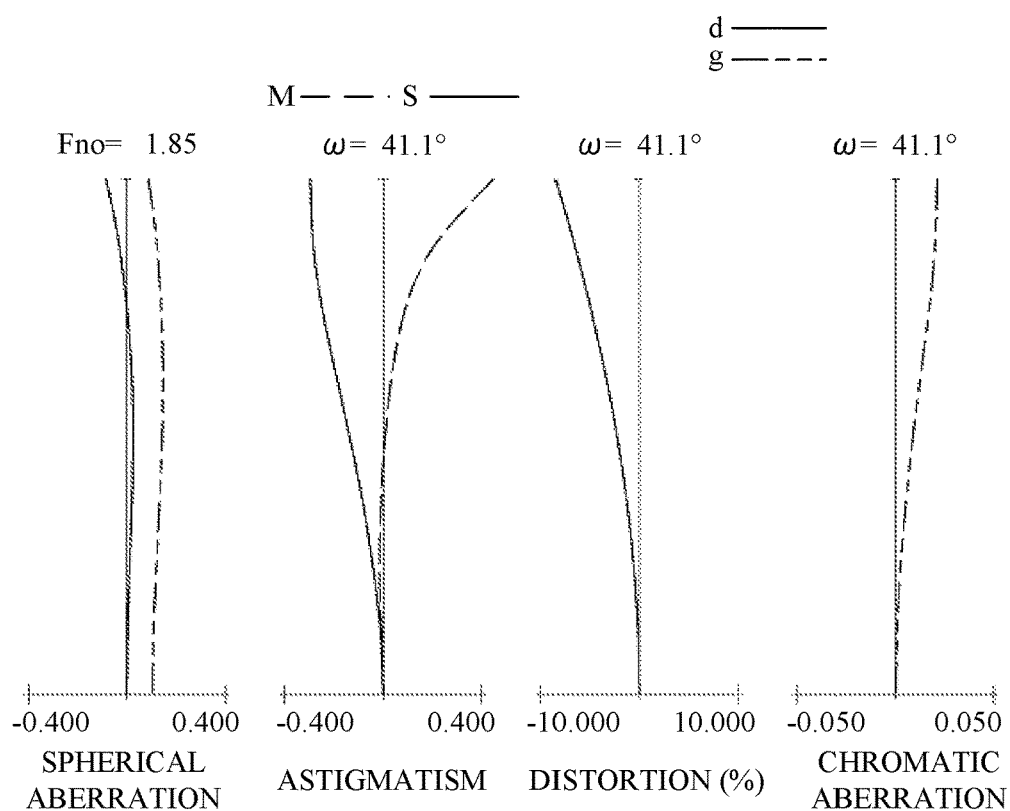
Figure 9:
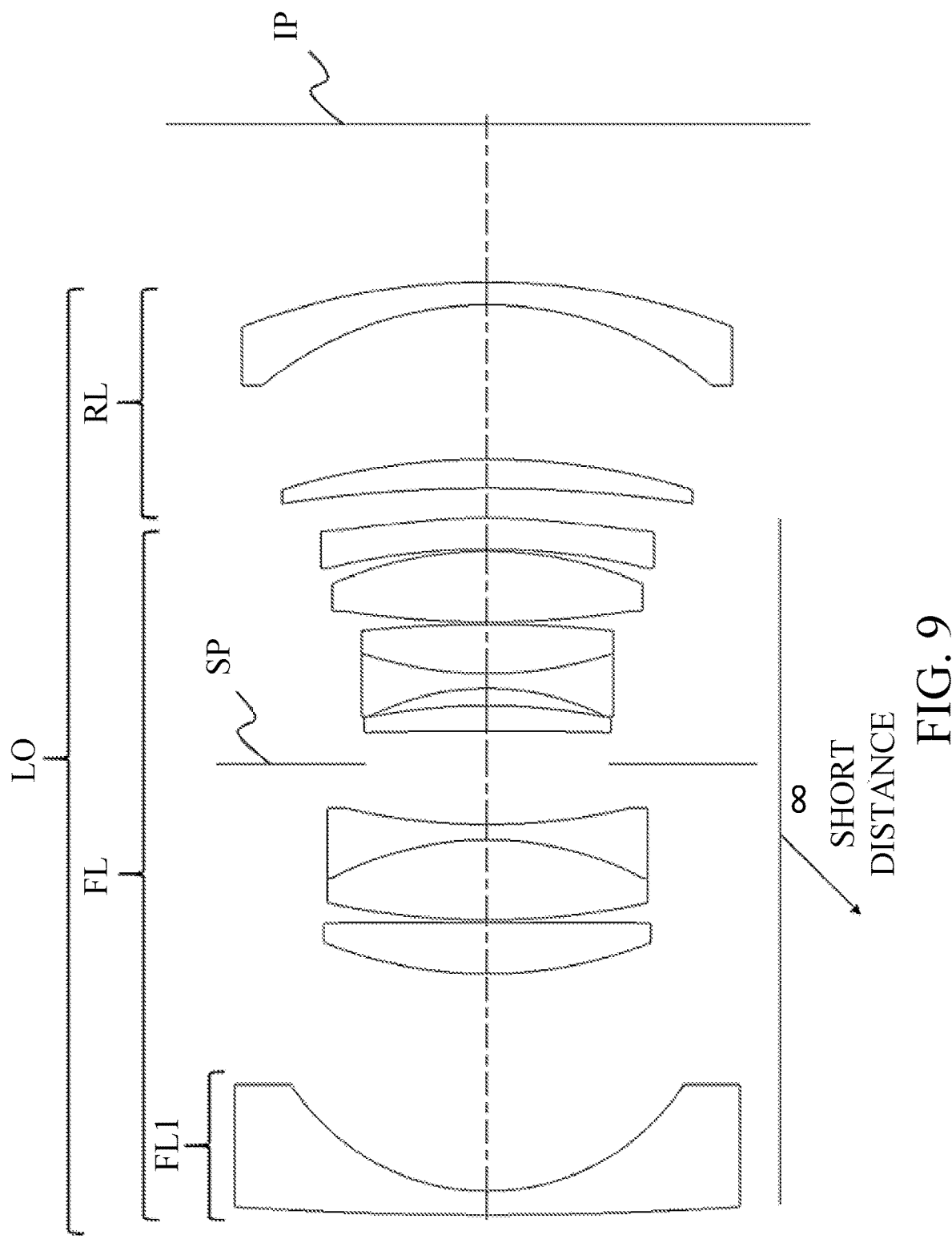
FIG. 9 is a sectional view of an optical system according to Example 5 in an in-focus state at infinity.
Figure 10A:
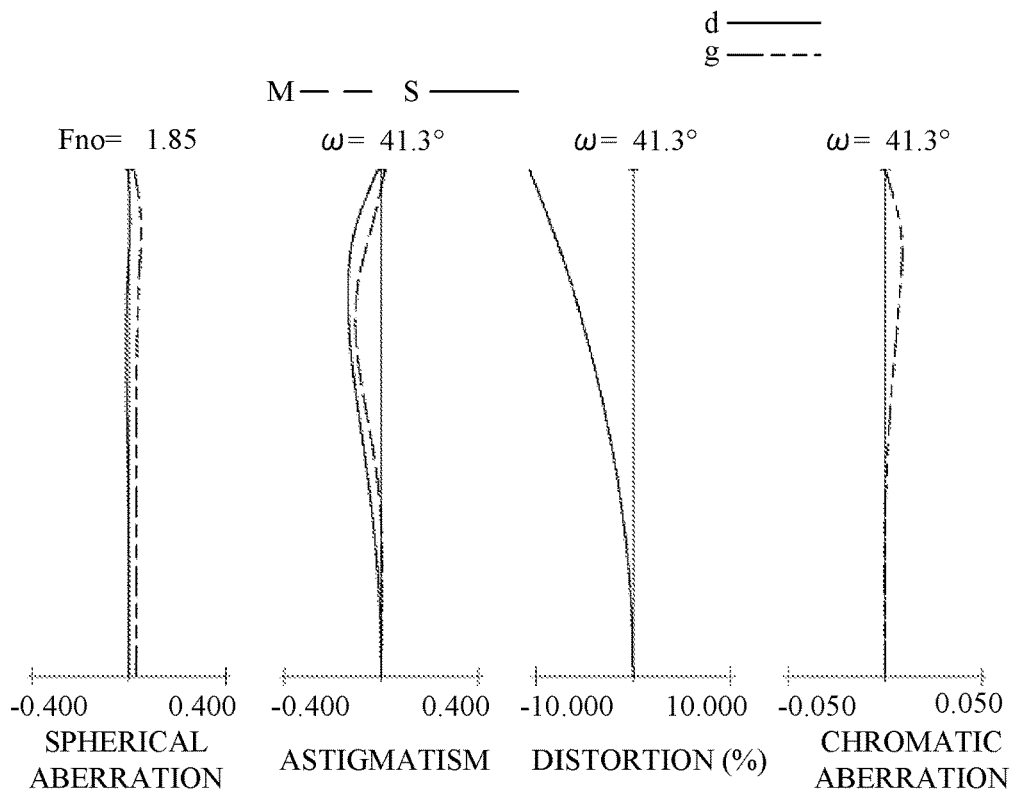
FIGS. 10A and 10B are aberration diagrams of the optical system according to Example 5 in the in-focus states at infinity and at an object distance with a lateral magnification of −0.5 times.
Figure 10B:
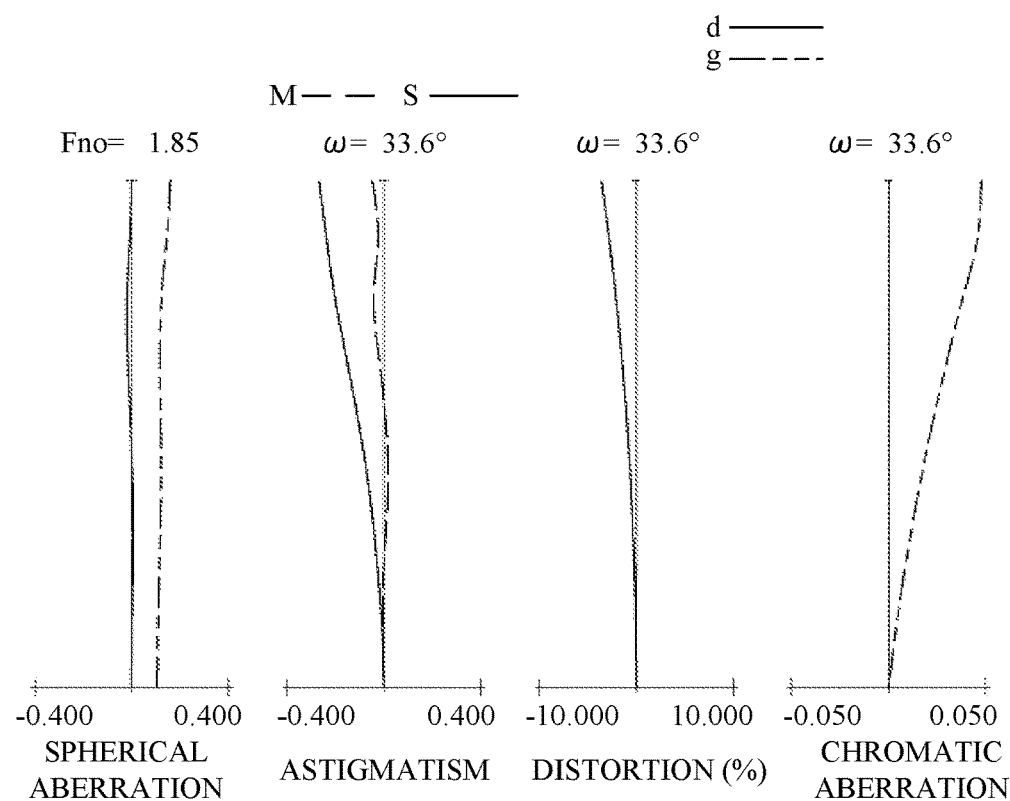
Figure 11:
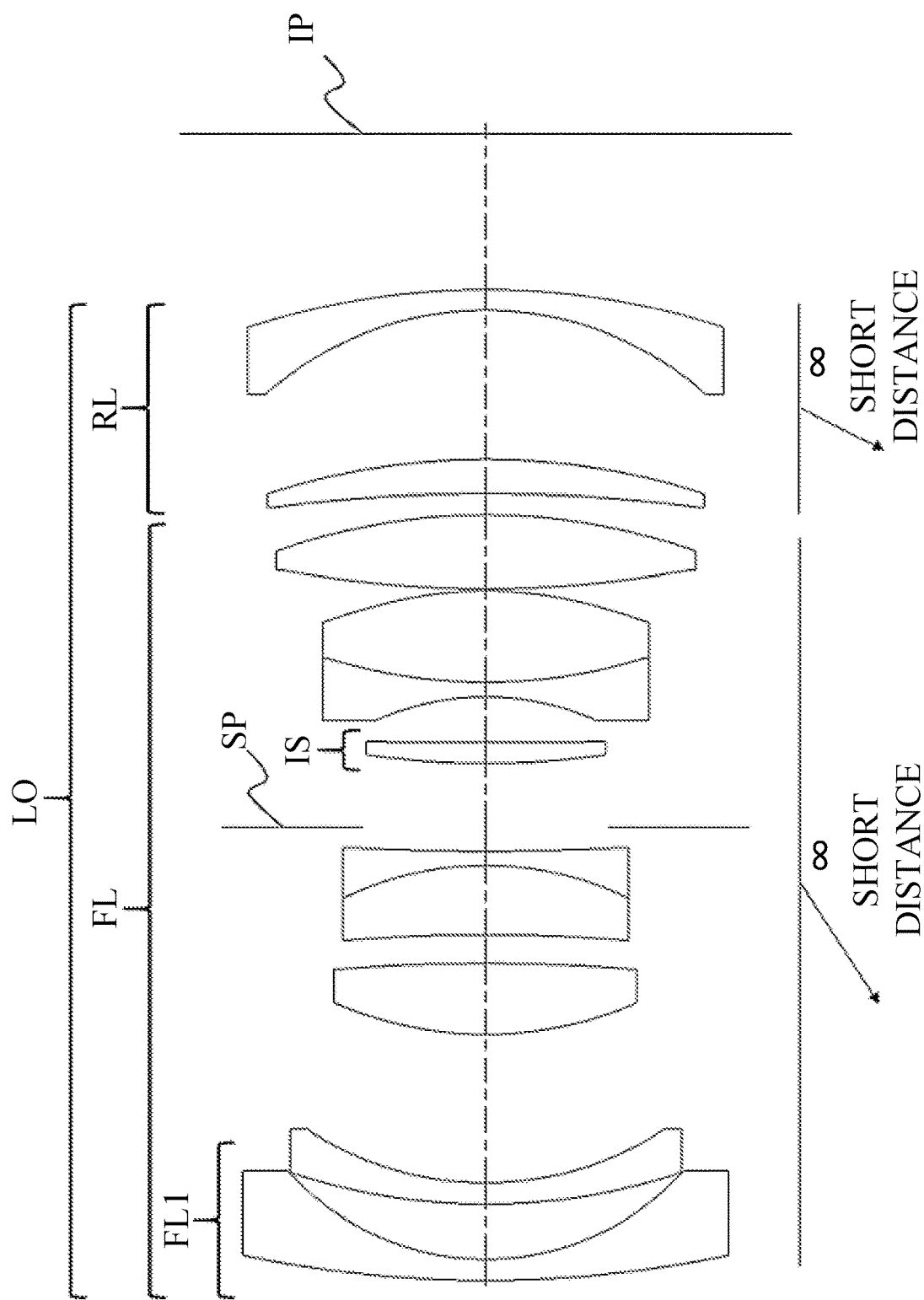
FIG. 11 is a sectional view of an optical system according to Example 6 in an in-focus state at infinity.
Figure 12A:
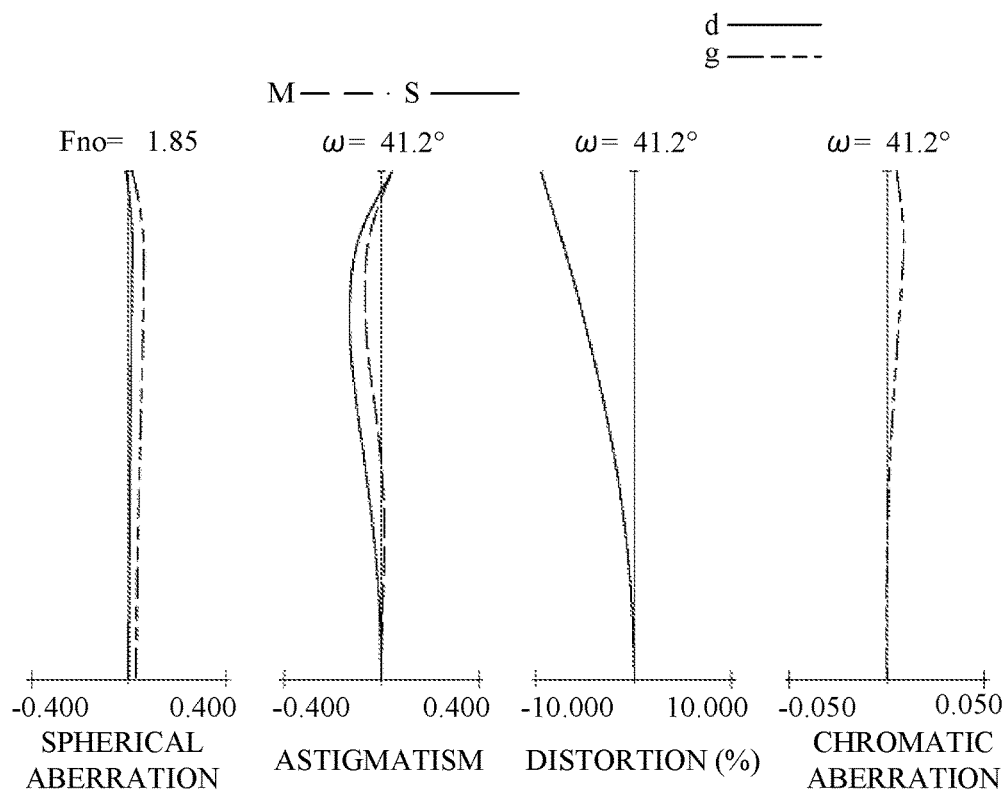
FIGS. 12A and 12B are aberration diagrams of the optical system according to Example 6 in the in-focus states at infinity and at an object distance with a lateral magnification of −0.5 times.
Figure 12B:
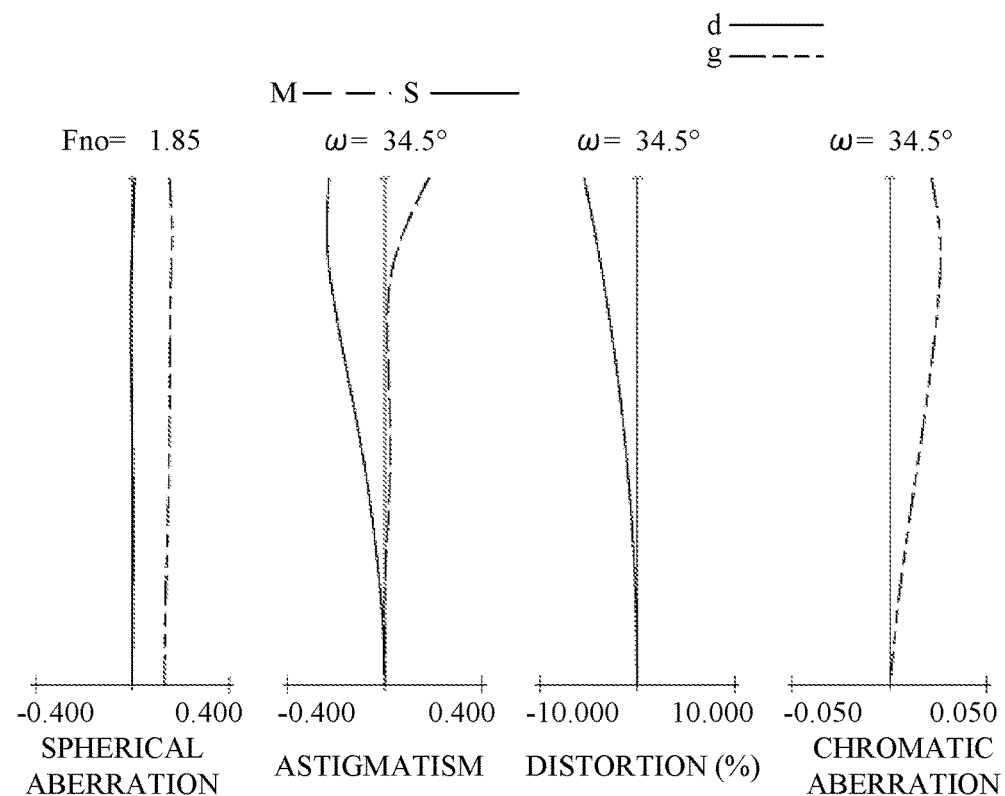

Referring now to the accompanying drawings, a description will now be given of examples of an optical system according to the aspect of the embodiments and an image pickup apparatus having the same.

FIGS. 1, 3, 5, 7, 9, and 11 are sectional views of optical systems L0 according to Examples 1 to 6 in an in-focus state at infinity, respectively. The optical system L0 according to each example is an optical system used for an image pickup apparatus such as a digital video camera, a digital still camera, a broadcasting camera, a film-based camera, and a surveillance camera. The optical system L0 according to each example may be used as a large-diameter wide-angle lens. Since it is assumed that a distortion in an image caused by the distortion of the optical system L0 according to each example is correctable by image processing, the optical system L0 according to each example is designed to allow the distortion. For example, the image pickup apparatus having the lens apparatus that includes the optical system L0 according to each example stores an acquired image in a memory in the lens apparatus, and corrects the distortion of the image through image processing unit in the image pickup apparatus using information on a distortion amount relating to an image formed by the optical system L0.

In each sectional view, the left side is an object side, and the right side is an image side. The optical system L0 according to each example includes a plurality of lens units. In the specification of this application, a lens unit is a group of lenses that integrally move or stand still during focusing. That is, in the optical system L0 according to each example, a distance between adjacent lens units changes during focusing from infinity to a short distance. The lens unit may include one or more lenses. The lens unit may include a diaphragm (aperture stop).

The optical system L0 according to each example includes, in order from the object side to the image side, a front unit FL having a positive refractive power and including one or more lens units that move during focusing, and a negative unit (negative lens unit) RL having a negative refractive power. The optical systems according to Examples 1, 2, 3, 5, and 6 include one lens unit (first lens unit) having a positive refractive power and serving as the front unit FL, and a second lens unit having a negative refractive power and serving as the rear unit RL. The optical system according to Example 4 includes a first lens unit having a negative refractive power and a second lens unit having a positive refractive power that serve as the front unit FL, and a third lens unit having a negative refractive power and serving as a rear unit RL.

In each sectional view, FLi represents an i-th lens unit (where i is a natural number) counted from the object side among lens units included in the front unit FL.

SP represents a diaphragm (aperture stop). IP represents an image plane. When the optical system L0 according to each example is used as an imaging optical system for a digital still camera or a digital video camera, an imaging plane of a solid state image sensor (photoelectric conversion element) such as a CCD sensor or a CMOS sensor is placed on the image plane IP. When the optical system L0 according to each example is used as an imaging optical system for a film-based camera, a photosensitive plane corresponding to a film plane is placed on the image plane IP. In the optical systems L0 according to Examples 1 to 4 and 6, IS represents an image stabilization lens unit, which can correct an image blur caused by a camera shake or the like by moving in the direction orthogonal to the optical axis.

In the optical system L0 according to each example, during focusing from infinity to a short distance, lens units included in the front unit FL move to the object side so as to widen a distance between the front unit FL and the rear unit RL. Arrows shown in each sectional view indicate a moving direction of the lens unit during focusing from infinity to a short distance.

The optical system L0 according to this example is a front focus type optical system, which is focusable in a wide object-distance range from infinity to a short distance and can be made small. It can reduce an extension amount during focusing, and satisfactorily suppress fluctuations in various aberrations during focusing, such as a spherical aberration and a curvature of field. As in the optical system L0 according to Example 4, the first subunit FL1 (first lens unit) having the negative refractive power and the second subunit FL2 (second lens) having the positive refractive power included in the front unit FL may be extended to the object side with different trajectories. This configuration can reduce an extension amount of the first subunit FL1, and secure a working distance during imaging at a short distance. Although the specification of this application discloses an example in which the front unit FL includes one or two lens units, the front unit FL including three or more lens units can provide the effects of the aspect of the embodiments, which will be described in detail later.

As in the optical system L0 according to Example 6, the rear unit RL may be extended to the object side in order to suppress fluctuations in curvature of field during focusing. However, this configuration increases the extension amount of the front unit FL during focusing, and thus the rear unit RL may be fixed during focusing as in the optical systems L0 according to Examples 1 to 5.

FIGS. 2A and 2B, 4A and 4B, 6A and 6B, 8A and 8B, 10A and 10B, 12A and 12B are aberration diagrams of the optical systems L0 according to Examples 1 to 6, respectively. In each aberration diagram, FIGS. 2A, 4A, 6A, 8A, 10A, and 12A are aberration diagrams in an in-focus state at infinity, and FIGS. 2B, 4B, 6B, 8B, 10B, and 12B are aberration diagrams in an in-focus state at a close distance.

In the spherical aberration diagram, Fno represents an F-number and the spherical aberration diagram shows spherical aberration amounts for the d-line (with a wavelength 587.6 nm) and the g-line (with a wavelength 435.8 nm). In the astigmatism diagram, M represents an astigmatism amount on a meridional image plane, and S represents an astigmatism amount on a sagittal image plane.

The distortion diagram shows a distortion amount for the d-line. The chromatic aberration diagram shows a chromatic aberration amount for the g-line. $\omega$ is an imaging half angle of view (degrees).

Next follows a description of the characteristic configuration of the optical system L0 according to each example.

The front unit FL has a first subunit FL1 having a negative refractive power and including a lens on the object side of a first positive lens that is one of positive lenses included in the optical system L0, which is the closest to the object. This configuration can promote the wide-angle scheme of the optical system L0 and satisfactorily correct the curvature of field. The lens closest to the object in the first subunit FL1 may be a negative meniscus lens having a concave surface facing the image plane so as to correct the aberration. The number of lenses included in the first subunit FL1 may be two or less. When the number of lenses included in the first subunit FL1 is three or more, the front unit FL serving as the focus unit becomes disadvantageously large.

The optical system L0 according to each example satisfies the following inequalities (1) to (4). Here, f is a focal length of the optical system L0 in the in-focus state at infinity. fFL1 is a focal length of the first subunit FL1. Nave is an average refractive index of the first subunit FL1. x is a distance on the optical axis from a surface on the image side of the lens closest to the object in the optical system L0 in the in-focus state at infinity to a surface on the object side of the first positive lens. TTL is a distance (overall optical length) on the optical axis from a lens surface closest to the object of the optical system L0 in the in-focus state at infinity to the image plane IP of the optical system L0. BF is a backfocus of the optical system L0 in the in-focus state at infinity.

$$-4.00<fFL1/x<-0.95 \qquad (1)$$

$$1.40<Nave<1.65 \qquad (2)$$

$$0.25<BF/f<0.95 \qquad (3)$$

$$0.13<x/TTL<0.35 \qquad (4)$$

The inequality (1) defines the focal length fFL1 and the distance x. Satisfying the inequality (1) can widen the light flux incident on the first positive lens with a short optical path length and within a suppressible range of the spherical aberration in an attempt to promote the wide-angle scheme of the optical system L0. If the negative refractive power of the first subunit FL1 becomes larger and the value is higher than the upper limit in the inequality (1), the spherical aberration cannot be satisfactorily corrected, or the optical path length becomes longer and the optical system L0 becomes disadvantageously larger. When the negative refractive power of the first subunit FL1 becomes smaller and the value is lower than the lower limit in the inequality (1), the light flux incident on the first subunit FL1 cannot be sufficiently large until it enters the first positive lens. For example, the height of the on-axis light flux from the optical axis cannot be sufficiently made high. Therefore, the subsequent lens unit(s) cannot satisfactorily correct the aberration.

The inequality (2) defines the average refractive index Nave of the first subunit FL1. Satisfying the inequality (2) can satisfactorily correct the curvature of field within a suppressible range of the spherical aberration in an attempt to promote the wide-angle scheme of the optical system L0. If the average refractive index Nave becomes higher than the upper limit in the inequality (2), the Petzval sum of the optical system L0 becomes large and the curvature of field cannot be satisfactorily corrected. If the average refractive index Nave is lower than the lower limit in the inequality (2), the curvature of the negative meniscus lens in the first subunit FL1 becomes large and the spherical aberration cannot be satisfactorily corrected.

The inequality (3) defines the backfocus BF and the focal length f. Satisfying the inequality (3) can make smaller the optical system L0. If the backfocus BF becomes longer and the value is higher than the upper limit in the inequality (3), the overall length of the optical system L0 becomes disadvantageously long. In one embodiment, when the backfocus BF becomes shorter and the value is lower than the lower limit in the inequality (3), the effective diameter required for the final lens becomes large because a distance between the image-side principal point and the final surface becomes longer and the optical system L0 becomes disadvantageously large.

The inequality (4) defines the distance x and the overall optical length TTL. Satisfying the inequality (4) can increase the light flux incident on the first positive lens with a short optical path length and within a suppressible range of the spherical aberration in an attempt to promote the wide-angle scheme of the optical system L0. If the distance x becomes longer and the value is higher than the upper limit in the inequality (4), there is no enough space for the lens unit configured to correct the spherical aberration or the like after the first positive lens. If the distance x becomes shorter and the value is lower than the lower limit in the inequality (4), the light flux incident on the first positive lens cannot be sufficiently increased in an attempt to promote the wide-angle scheme of the optical system L0, and the subsequent lens unit(s) cannot satisfactorily correct the aberration.

The numerical ranges of the inequalities (1) to (4) may be set to those of the following inequalities (1a) to (4a):

$$-3.50<fFL1/x<-0.98 \qquad (1a)$$

$$1.42<Nave<1.60 \qquad (2a)$$

$$0.3<BF/f<0.8 \qquad (3a)$$

$$0.15<x/TTL<0.32 \qquad (4a)$$

The numerical ranges of the inequalities (1) to (4) may be set to those of the following inequalities (1b) to (4b):

$$-3<fFL1/x<-1 \qquad (1b)$$

$$1.45<Nave<1.55 \qquad (2b)$$

$$0.35<BF/f<0.70 \qquad (3b)$$

$$0.16<x/TTL<0.30 \qquad (4b)$$

The above configuration can realize a compact optical system L0 that has a high optical performance and is easy to manufacture.

In the optical system L0 according to each example, the following inequality (5) may be satisfied:

$$0.07<Ndp-Ndn<0.25 \qquad (5)$$

where Ndp is a maximum refractive index of a positive lens included in the first cemented lens disposed on the object side of the diaphragm SP, and Ndn is a minimum refractive index of a negative lens included in the first cemented lens.

The inequality (5) defines the maximum refractive index Ndp and the minimum refractive index Ndn. Satisfying the inequality (5) can reduce the Petzval sum within a suppressible range of the longitudinal (or axial) chromatic aberration in correcting the curvature of field of the optical system L0. If the value is higher than the upper limit in the inequality (5), the first cemented lens cannot be sufficiently achromatic in selecting a general lens glass material. If the value is lower than the lower limit in the inequality (5), the Petzval sum cannot be sufficiently reduced in selecting the general lens glass material.

In the optical system L0 according to each example, the following inequality (6) may be satisfied:

$$25<vdp-vdn<70 \qquad (6)$$

where vdp is a maximum Abbe number of a positive lens included in the second cemented lens disposed on the image side of the diaphragm SP, and vdn is a minimum Abbe number of a negative lens included in the second cemented lens.

The inequality (6) defines the maximum Abbe number vdp and the minimum Abbe number vdn. Satisfying the inequality (6) can provide an achromatic feature within a suppressible range of the curvature of field in reducing the chromatic aberration of the optical system L0. If the value is higher than the upper limit in the inequality (6), the Petzval sum becomes so large in selecting the general lens glass material that the curvature of field cannot be suppressed. If the value is lower than the lower limit in the inequality (6), the chromatic aberration cannot be sufficiently corrected.

In the optical system L0 according to each example, the following inequality (7) may be satisfied:

$$0.63 < \varphi r/\varphi max \leq 1.00 \quad (7)$$

where $\varphi r$ is a maximum effective diameter of a lens closest to the image plane of the optical system L0, and $\varphi max$ is a maximum effective diameter of lenses included in the optical system L0.

The inequality (7) defines the maximum effective diameters $\varphi r$ and $\varphi max$. Satisfying the inequality (7) can suppress an increase in diameter of the front lens of the optical system L0. If the value is lower than the lower limit in the inequality (7), the front lens diameter of the optical system L0 becomes too large and the optical system L0 becomes disadvantageously large.

The following inequality (8) may be satisfied:

$$0.7 < \varphi f/\varphi r < 1.3 \quad (8)$$

where $\varphi f$ is a maximum effective diameter of the lens closest to the object in the optical system L0 according to each example.

The inequality (8) defines the maximum effective diameters $\varphi f$ and $\varphi r$. Satisfying the inequality (8) can symmetrize the lens shape of the optical system L0 in satisfactorily correcting off-axis aberrations such as a coma and a curvature of field of the optical system L0. If the value is higher than the upper limit or lower than the lower limit in the inequality (8), the symmetry of the lens shape is broken and the off-axis aberrations such as the coma and the curvature of field cannot be satisfactorily corrected.

The optical system L0 according to each example may satisfy the following inequality (9):

$$0.06 < BF/TTL < 0.35 \quad (9)$$

The inequality (9) defines the backfocus BF and the overall optical length TTL. Satisfying the inequality (9) can shorten the overall length of the optical system L0. If the backfocus BF becomes longer and the value is higher than the upper limit in the inequality (9), the overall length of the optical system L0 becomes disadvantageously long. If the value is lower than the lower limit in the inequality (9), a distance becomes short between the optical system L0 and the imaging plane on which the image sensor or the like is disposed, and the space for disposing the color filter or the like becomes unavailable.

The optical system L0 according to each example may satisfy the following inequality (10):

$$-2.0 < fFL1/f < -0.1 \quad (10)$$

The inequality (10) defines the focal lengths fFL1 and f. Satisfying the inequality (10) can increase the light flux incident on the first positive lens with a short optical path length and within a suppressible range of the spherical aberration in an attempt to promote the wide-angle scheme of the optical system L0. If the negative refractive power of the first subunit FL1 becomes larger and the value is higher than the upper limit in the inequality (10), the spherical aberration cannot be satisfactorily corrected. In one embodiment, when the negative refractive power of the first subunit FL1 becomes smaller and the value is lower than the lower limit in the inequality (10), the optical path length required to make wide the light flux incident on the first positive lens becomes longer and the optical system L0 becomes disadvantageously large.

The optical system L0 according to each example may satisfy the following inequality (11):

$$-22 < fRL/f < -5 \quad (11)$$

where fRL is a focal length of the rear unit RL.

The inequality (11) defines the focal lengths fRL and f. Satisfying the inequality (11) can suppress the fluctuation of the coma during focusing in reducing the extension amount of the front unit FL as the focus unit during focusing. If the refractive power of the positive lens in the rear unit RL is higher and the value is higher than the upper limit in the inequality (11), the fluctuation of the coma during focusing cannot be satisfactorily suppressed. If the negative refractive power of the rear unit RL becomes smaller and the value is lower than the lower limit in the inequality (11), the extension amount of the front unit FL during focusing becomes disadvantageously large.

The optical system L0 according to each example may satisfy the following inequality (12):

$$0.2 < V < 0.6 \quad (12)$$

where V is a third-order distortion coefficient of the optical system L0 in the in-focus state at infinity.

The inequality (12) defines the distortion coefficient V. Satisfying the inequality (12) can move, in an attempt to make small the optical system L0, an entrance pupil position to the object side by increasing the negative refractive power of the first subunit FL, and reduce the front lens diameter, thereby satisfactorily correcting various aberrations other than the distortion. Here, the distortion coefficient V is a general expression explained by the third-order aberration theory, and is expressed by the following expression.

$$V = \Sigma V\nu \quad (\nu 0 \text{ is a natural number})$$

The subscript ν describes a surface number of each lens in the optical system L0 according to each example, and Vν is a distortion coefficient of the ν-th lens surface counted from the object side obtained by paraxial ray tracing. The distortion coefficient Vν of each lens surface is expressed by the following expression.

$$V_\nu = \overline{h}_\nu (\overline{h}_\nu \overline{Q}_\nu)^2 \{h_\nu \Delta_\nu (1/N_s)\} + (\overline{h}_\nu \overline{Q}_\nu) \{\overline{h}_\nu \Delta_\nu (1/Nt)\}$$

Each expression that composes the above expression is represented by the following expressions:

$$\overline{h}_\nu \overline{Q}_\nu = \overline{h}_\nu N_\nu / r_\nu - \overline{\alpha}_\nu$$

$$h_\nu \Delta_\nu (1/Ns) = \alpha_\nu' / N_\nu'^2 - \alpha_\nu / N_\nu^2$$

$$\overline{h}_\nu \Delta_\nu (1/Nt) = \overline{\alpha}_\nu' / N_\nu'^2 - \overline{\alpha}_\nu / N_\nu^2$$

Nine variables ($h_\nu$, $\overline{h}_\nu$, $\alpha_\nu$, $\overline{\alpha}_\nu$, $\alpha_\nu'$, $\overline{\alpha}_\nu'$, $r_\nu$, $N_\nu$, $N_\nu'$) used in the above expressions mean the light ray passing through the ν-th lens surface, and the radius of curvature of the lens surface, and the refractive index in the paraxial ray tracing. $h_\nu$ is a height from the optical axis of a light ray at an intersection when the light ray emitted from the on-axis object point passes through the ν-th lens surface. $\overline{h}_\nu$ is a height from the optical axis of a light ray at an intersection when the light ray emitted from the off-axis object point passes through the ν-th lens surface. $\alpha_\nu$ is a conversion tilt angle between a light ray and the optical axis when the light ray emitted from the on-axis object point enters the ν-th lens surface. $\overline{\alpha}_\nu$ is a conversion tilt angle between a light ray and the optical axis when the light ray emitted from the off-axis object point enters the ν-th lens surface. $\alpha_\nu$ is a conversion tilt angle between a light ray and the optical axis when the light ray emitted from the on-axis object point is emitted from the ν-th lens surface. $\overline{\alpha}_\nu'$ is a conversion tilt angle between a light ray and the optical axis when the light ray emitted from the off-axis object point is emitted from the ν-th lens surface. $r_v$ is a radius of curvature of the ν-th lens surface. Nν is a refractive index of a space on the object side of the ν-th lens surface. Nν' is a refractive index of a space on the image side of the ν-th lens surface.

The distortion coefficient V in the disclosure uses a value in the in-focus state at infinity in the air. Therefore, as an initial condition for ray tracing to obtain the distortion coefficient V, a light ray emitted from an on-axis object point and incident on the first lens surface has $h_1$ of 1 and $\alpha_1$ of 0. A light ray emitted from the off-axis object point and incident on the first lens surface has $\bar{h}_1$ of −t (where t is a distance on the optical axis from the first lens surface to the entrance pupil position of the optical system L0) and $\bar{\alpha}_1$ of −1. The refractive index N of air is 1. The power $\varphi v$ of the ν-th lens surface is $(N_v' - N_v)/r_v$, and the conversion interval $e_v'$ from the ν-th lens surface to the (ν+1)-th lens surface is $d_v'/N_v'$ (where $d_v'$ is a surface distance on the optical axis from the ν-th lens surface to the (ν+1)-th lens surface). Ray tracing from the on-axis object point is performed using the following three expressions:

$$\alpha_v' = \alpha_v + h_v \varphi_v$$

$$h_{v+1} = h_v - e_v' \alpha_v'$$

$$\alpha_{v+1} = \alpha_v'$$

Ray tracing from the off-axis object point is performed using the following three expressions:

$$\bar{\alpha}_v' = \bar{\alpha}_v + \bar{h}_v \varphi_v$$

$$\bar{h}_{v+1} = \bar{h}_v - e_v' \bar{\alpha}_v'$$

$$\bar{\alpha}_{v+1} = \bar{\alpha}_v'$$

If the distortion coefficient V becomes larger than the upper limit in the inequality (12), various aberrations such as the curvature of field cannot be satisfactorily corrected by the optical system L0. If the distortion coefficient V becomes smaller than the lower limit in the inequality (12), the negative refractive power of the first subunit FL cannot be sufficiently made large, the front lens becomes large, and the optical system L0 becomes disadvantageously large.

The optical system L0 according to each example may satisfy the following inequality (13):

$$-20 < \text{dist}(\omega) < -5 \quad (13)$$

where $\text{dist}(\omega)$ is a distortion amount at the maximum imaging half-angle of view ω in the in-focus state at infinity.

The inequality (13) defines the distortion amount $\text{dist}(\omega)$. Satisfying the inequality (13) moves, in an attempt to make compact the optical system L0, the entrance pupil position to the object side by increasing the negative refractive power of the first subunit FL, makes compact the front lens diameter, and thereby satisfactorily corrects various aberrations other than the distortion. The distortion amount $\text{dist}(\omega)$ is calculated by the relational expression $(y'-y0)/y0\times100[\%]$ of the ideal image height y0 and the real image height y' in the projection method of $y = f \times \tan \omega$. The ideal image height y0 is given by the specification of the optical system L0 (focal length f and maximum imaging half angle of view ω), and the real image height y' is given by a height of a light ray from the optical axis in the image plane IP of a principal ray that enters the optical system L0 at the maximum imaging half angle of view ω. If the distortion amount $\text{dist}(\omega)$ is higher than the upper limit in the inequality (13), various aberrations such as the curvature of field cannot be satisfactorily corrected by the optical system L0. If the distortion amount $\text{dist}(\omega)$ is lower than the lower limit in the inequality (13), the negative refractive power of the first subunit FL cannot be sufficiently made larger, so that the front lens becomes large and the optical system L0 becomes disadvantageously large.

The numerical ranges of the inequalities (5) to (13) may be set to those of the following inequalities (5a) to (13a):

$$0.08 < Ndp - Ndn < 0.22 \quad (5a)$$

$$30 < vdp - vdn < 65 \quad (6a)$$

$$0.73 < \varphi r/\varphi \max \leq 1.00 \quad (7a)$$

$$0.85 < \varphi f/\varphi r < 1.29 \quad (8a)$$

$$0.08 < BF/TTL < 0.25 \quad (9a)$$

$$-1.8 < fFL1/f < -0.5 \quad (10a)$$

$$-22 < fRL/f < -6 \quad (11a)$$

$$0.23 < V < 0.55 \quad (12a)$$

$$-18.0 < \text{dist}(\omega) < -5.5 \quad (13a)$$

The numerical range of the inequalities (5) to (13) may be set to those of the following inequalities (5b) to (13b):

$$0.09 < Ndp - Ndn < 0.20 \quad (5b)$$

$$32 < vdp - vdn < 60 \quad (6b)$$

$$0.78 < \varphi f/\varphi \max \leq 1.00 \quad (7b)$$

$$0.90 < \varphi f/\varphi r < 1.28 \quad (8b)$$

$$0.09 < BF/TTL < 0.20 \quad (9b)$$

$$-1.5 < fFL1/f < -0.8 \quad (10b)$$

$$-20 < fRL/f < -7 \quad (11b)$$

$$0.26 < V < 0.50 \quad (12b)$$

$$-16 < \text{dist}(\omega) < -6 \quad (13b)$$

In the optical system L0 according to each example, the front unit FL may include a diaphragm SP disposed on the image side of the first positive lens. In the front unit FL, a first positive lens, which is separated from the first subunit FL1 at the maximum air spacing and whose convex surface faces the object, a first cemented lens, and a second cemented lens may gather near the diaphragm SP where the marginal ray height becomes large. Thereby, various aberrations can be satisfactorily corrected, such as the spherical aberration and the longitudinal chromatic aberration, which would otherwise increase as the lens diameter becomes larger. The front unit FL may include at least one aspherical lens with a surface having a shape in which the negative refractive power becomes stronger from the center to the periphery on the image side of the first subunit FL1 in order to satisfactorily correct the curvature of field. This configuration can realize a compact optical system L0 having a high optical performance in the in-focus state at infinity.

In the optical system L0 according to each example, the rear unit RL may include, in order from the object side to the image side, a positive lens and a negative lens. The positive lens disposed on the object side can satisfactorily suppress fluctuations in coma during focusing.

Since the optical system L0 allows the distortion, it is not necessary to provide the aspherical lens to the first subunit FL1 that is disposed at a position where the height of the off-axis light ray from the optical axis is high. The manufacturing sensitivity can be reduced using no aspherical lens.

As in the optical systems L0 according to Examples 1 to 4 and 6, the front unit FL may have the image stabilization lens unit IS disposed adjacent to the diaphragm SP. The image stabilization lens unit IS can correct an image blur caused by a camera shake by moving in the direction orthogonal to the optical axis of the optical system L0. The image stabilization lens unit IS may include one lens. In one embodiment, when the image stabilization lens unit IS includes two or more lenses, the lens becomes heavier, a high-output actuator is required to correct the camera shake, and the optical system L0 becomes disadvantageously large.

Numerical examples 1 to 6 corresponding to Examples 1 to 6 will be shown below.

In surface data according to each numerical example, r represents a radius of curvature of each optical surface, and d (mm) represents an on-axis distance (distance on the optical axis) between an m-th surface and an (m+1)-th surface, where m is a surface number counted from the light incident side. nd represents a refractive index of each optical element for the d-line, and vd represents an Abbe number of the optical element. The Abbe number vd of a certain material is expressed as:

$$vd=(Nd-1)/(NF-NC)$$

where Nd, NF, and NC are refractive indexes for the d-line (587.6 nm), the F-line (486.1 nm), the C-line (656.3 nm) in the Fraunhofer line.

In each numerical example, all of d, a focal length (mm), an F-number, and a half angle of view (°) have values when the optical system in each example focuses on an object at infinity (infinity object). The backfocus BF is an air equivalent distance on the optical axis from the final lens surface (lens surface closest to the image plane) to the paraxial image surface. The overall optical length is a value obtained by adding the backfocus to the distance on the optical axis from the foremost lens surface (lens surface closest to the object) to the final lens surface. The lens unit includes a single lens or a plurality of lenses.

When the optical surface is an aspherical surface, a * symbol is attached to the right side of the surface number. The aspherical shape is expressed as follows: $x=(h^2/R)/[1+\{1-(1+k)(h/R)^2\}^{1/2}]+A4 \times h^4+A6 \times h^6+A8 \times h^8+A10 \times h^{10}+A12 \times h^{12}$ where X is a displacement amount from the surface apex in the optical axis direction, h is a height from the optical axis in the direction orthogonal to the optical axis, R is a paraxial radius of curvature, k is a conical constant, A4, A6, A8, A10, and A12 are aspherical coefficients of each order. In addition, "e±XX" in each aspherical coefficient means "$\times 10^{\pm XX}$."

Numerical Example 1

UNIT: mm

Surface Data

| Surface Number | r | d | nd | vd | Effective Diameter |
|---|---|---|---|---|---|
| 1 | 166.725 | 1.50 | 1.51633 | 64.1 | 31.47 |
| 2 | 17.847 | 13.73 | | | 25.56 |
| 3 | 30.903 | 3.94 | 1.90043 | 37.4 | 22.17 |
| 4 | −170.378 | 3.36 | | | 21.98 |
| 5 | −200.954 | 4.00 | 1.91082 | 35.3 | 20.73 |
| 6 | −21.588 | 1.00 | 1.72825 | 28.5 | 20.50 |
| 7 | 90.491 | 2.02 | | | 19.36 |
| 8(Diaphragm) | ∞ | 3.27 | | | 18.88 |
| 9 | 70.847 | 1.74 | 1.80400 | 46.5 | 17.66 |
| 10 | −300.114 | 3.64 | | | 17.35 |
| 11 | −18.714 | 1.00 | 1.85478 | 24.8 | 16.23 |
| 12 | 38.885 | 5.54 | 1.49700 | 81.5 | 16.83 |
| 13* | −28.697 | 0.15 | | | 20.57 |
| 14 | 248.946 | 4.85 | 1.95375 | 32.3 | 24.38 |
| 15 | −29.607 | (Variable) | | | 25.47 |
| 16 | −66.159 | 2.20 | 1.72916 | 54.7 | 29.66 |
| 17 | −40.851 | 10.00 | | | 30.07 |
| 18 | −23.830 | 1.50 | 1.51742 | 52.4 | 31.01 |
| 19 | −45.530 | 13.20 | | | 33.52 |
| Image Plane | ∞ | | | | |

ASPHERIC DATA
13th Surface

K = 0.00000e+000   A 4 = 1.51499e−005   A 6 = −1.89505e−008
A 8 = 4.59451e−010   A10 = −1.29807e−012   A12 = −2.87757e−015

VARIOUS DATA

| | |
|---|---|
| Focal Length: | 28.60 |
| FNO: | 1.85 |
| Half Angle of View (°): | 37.1 |
| Image Height: | 20.15 |
| Overall Optical Length: | 81.00 |
| BF | 13.20 |

| UNIT: mm | | |
|---|---|---|
| | Infinity | Short Distance |
| d15 | 4.37 | 19.01 |

| Lens Unit Data | | |
|---|---|---|
| Lens Unit | Starting Surface | Focal Length: |
| FL | 1 | 28.89 |
| RL | 16 | −394.81 |

| Single Lens Data | | |
|---|---|---|
| Lens | Starting Surface | Focal Length: |
| 1 | 1 | −38.84 |
| 2 | 3 | 29.32 |
| 3 | 5 | 26.27 |
| 4 | 6 | −23.84 |
| 5 | 9 | 71.44 |
| 6 | 11 | −14.66 |
| 7 | 12 | 34.15 |
| 8 | 14 | 27.98 |
| 9 | 16 | 141.29 |
| 10 | 18 | −98.96 |

Numerical Example 2

| UNIT: mm | | | | | |
|---|---|---|---|---|---|
| Surface Data | | | | | |
| Surface Number | r | d | nd | vd | Effective Diameter |
| 1 | 50.658 | 1.57 | 1.48749 | 70.2 | 39.00 |
| 2 | 17.433 | 7.73 | | | 29.64 |
| 3 | 82.620 | 1.50 | 1.48749 | 70.2 | 28.85 |
| 4 | 22.068 | 13.94 | | | 25.42 |
| 5 | 28.055 | 5.75 | 1.90043 | 37.4 | 19.63 |
| 6 | −26.190 | 1.00 | 1.80000 | 29.8 | 19.37 |
| 7 | −678.364 | 6.06 | | | 18.87 |
| 8(Diaphragm) | ∞ | 2.86 | | | 16.75 |
| 9 | 74.460 | 1.40 | 1.77250 | 49.6 | 15.62 |
| 10 | −3498.619 | 2.98 | | | 15.34 |
| 11 | −20.479 | 1.00 | 1.85478 | 24.8 | 14.46 |
| 12 | 30.759 | 3.15 | 1.49700 | 81.5 | 14.74 |
| 13 | −76.152 | 0.29 | | | 17.08 |
| 14 | 107.343 | 4.13 | 1.58313 | 59.4 | 19.96 |
| 15* | −42.035 | 0.15 | | | 22.35 |
| 16 | 108.394 | 4.96 | 1.85150 | 40.8 | 25.38 |
| 17 | −35.438 | (Variable) | | | 26.28 |
| 18 | −72.427 | 1.84 | 1.83481 | 42.7 | 27.19 |
| 19 | −45.108 | 10.50 | | | 27.56 |
| 20 | −23.819 | 1.57 | 1.51742 | 52.4 | 28.87 |
| 21 | −53.298 | 11.00 | | | 31.31 |
| Image Plane | ∞ | | | | |

| ASPHERIC DATA | | |
|---|---|---|
| 15th Surface | | |
| $K = 0.00000e+000$ | $A4 = 2.14904e-005$ | $A6 = -6.26885e-009$ |
| $A8 = 3.11936e-010$ | $A10 = -1.96590e-012$ | $A12 = 3.25155e-015$ |

| VARIOUS DATA | |
|---|---|
| Focal Length: | 20.60 |
| FNO: | 1.85 |
| Half Angle of View (°): | 46.4 |
| Image Height: | 18.71 |
| Overall Optical Length: | 84.87 |
| BF | 11.00 |

-continued

| UNIT: mm | | |
|---|---|---|
| | Infinity | Short Distance |
| d17 | 1.50 | 11.92 |

| Lens Unit Data | | |
|---|---|---|
| Lens Unit | Starting Surface | Focal Length: |
| FL | 1 | 20.75 |
| RL | 18 | −255.10 |

| Single Lens Data | | |
|---|---|---|
| Lens | Starting Surface | Focal Length: |
| 1 | 1 | 55.38 |
| 2 | 3 | −62.27 |
| 3 | 5 | 15.84 |
| 4 | 6 | −34.08 |
| 5 | 9 | 94.40 |
| 6 | 11 | −14.25 |
| 7 | 12 | 44.52 |
| 8 | 14 | 52.33 |
| 9 | 16 | 31.87 |
| 10 | 18 | 139.00 |
| 11 | 20 | −84.77 |

Numerical Example 3

| UNIT: mm | | | | |
|---|---|---|---|---|
| Surface Data | | | | |
| Surface Number | r | d | nd | vd | Effective Diameter |
| 1 | 352.223 | 1.57 | 1.51633 | 64.1 | 33.00 |
| 2 | 16.734 | 15.32 | | | 25.69 |
| 3 | 32.834 | 3.88 | 1.91082 | 35.3 | 20.54 |
| 4 | −101.361 | 2.45 | | | 20.39 |
| 5 | −173.026 | 3.85 | 1.90043 | 37.4 | 19.43 |
| 6 | −20.106 | 1.00 | 1.72825 | 28.5 | 19.21 |
| 7 | 92.116 | 2.92 | | | 18.19 |
| 8(Diaphragm) | ∞ | 3.40 | | | 17.43 |
| 9 | 70.143 | 1.65 | 1.67790 | 55.3 | 16.24 |
| 10 | −252.397 | 3.51 | | | 15.95 |
| 11 | −15.958 | 1.00 | 1.85478 | 24.8 | 15.03 |
| 12 | 71.900 | 3.99 | 1.49700 | 81.5 | 19.50 |
| 13 | −28.609 | 0.15 | | | 18.99 |
| 14 | 162.276 | 5.15 | 1.91082 | 35.3 | 22.80 |
| 15 | −27.659 | 0.15 | | | 24.07 |
| 16 | −83.020 | 2.50 | 1.53110 | 55.9 | 24.80 |
| 17* | −48.642 | (Variable) | | | 25.55 |
| 18 | −79.703 | 2.09 | 1.72916 | 54.7 | 28.60 |
| 19 | −45.710 | 10.30 | | | 29.00 |
| 20 | −24.031 | 2.55 | 1.51742 | 52.4 | 30.41 |
| 21 | −44.953 | 11.00 | | | 33.46 |
| Image Plane | ∞ | | | | |

| ASPHERIC DATA | | |
|---|---|---|
| 17th Surface | | |
| K = 0.00000e+000 | A 4 = 1.70126e−005 | A 6 = −2.50325e−009 |
| A 8 = 1.03885e−010 | A10 = −5.41918e−013 | A12 = 1.15952e−015 |

| VARIOUS DATA | |
|---|---|
| Focal Length: | 24.72 |
| FNO: | 1.85 |
| Half Angle of View (°): | 41.2 |
| Image Height: | 19.34 |
| Overall Optical Length: | 81.00 |
| BF | 11.00 |

-continued

| UNIT: mm | | |
|---|---|---|
| | Infinity | Short Distance |
| d17 | 2.56 | 15.56 |

| Lens Unit Data | | |
|---|---|---|
| Lens Unit | Starting Surface | Focal Length: |
| FL | 1 | 25.09 |
| RL | 18 | −459.74 |

| Single Lens Data | | |
|---|---|---|
| Lens | Starting Surface | Focal Length: |
| 1 | 1 | −34.08 |
| 2 | 3 | 27.61 |
| 3 | 5 | 24.97 |
| 4 | 6 | −22.58 |
| 5 | 9 | 81.14 |
| 6 | 11 | −15.20 |
| 7 | 12 | 41.73 |
| 8 | 14 | 26.28 |
| 9 | 16 | 215.73 |
| 10 | 18 | 143.27 |
| 11 | 20 | −104.12 |

Numerical Example 4

| UNIT: mm | | | | |
|---|---|---|---|---|
| Surface Data | | | | |
| Surface Number | r | d | nd | vd | Effective Diameter |
| 1 | 67.195 | 1.57 | 1.48749 | 70.2 | 39.00 |
| 2 | 18.918 | 7.01 | | | 30.04 |
| 3 | 105.995 | 1.50 | 1.48749 | 70.2 | 29.39 |
| 4 | 25.853 | (Variable) | | | 26.24 |
| 5 | 29.535 | 4.41 | 1.90043 | 37.4 | 18.94 |
| 6 | −40.982 | 1.00 | 1.80000 | 29.8 | 18.75 |
| 7 | −398.457 | 6.44 | | | 18.47 |
| 8(Diaphragm) | ∞ | 2.93 | | | 16.53 |
| 9 | 96.281 | 1.33 | 1.77250 | 49.6 | 15.57 |
| 10 | −501.436 | 2.99 | | | 15.35 |
| 11 | −19.791 | 1.00 | 1.85478 | 24.8 | 14.60 |
| 12 | 31.208 | 4.04 | 1.49700 | 81.5 | 15.05 |
| 13 | −38.215 | 0.15 | | | 17.83 |
| 14* | 99.997 | 3.68 | 1.58313 | 59.4 | 20.79 |
| 15* | −55.869 | 0.45 | | | 23.06 |
| 16 | 418.363 | 5.30 | 1.85150 | 40.8 | 25.67 |
| 17 | −28.156 | (Variable) | | | 26.72 |
| 18 | −110.776 | 1.87 | 1.83481 | 42.7 | 27.94 |
| 19 | −57.108 | 10.50 | | | 28.22 |
| 20 | −23.854 | 1.57 | 1.51742 | 52.4 | 28.97 |
| 21 | −72.046 | 11.52 | | | 31.58 |
| Image Plane | ∞ | | | | |

| ASPHERIC DATA | | |
|---|---|---|
| 14th Surface | | |
| K = 0.00000e+000 | A 4 = −1.52854e−005 | A 6 = −2.71853e−008 |
| A 8 = −4.82286e−010 | | |
| 15th Surface | | |
| K = 0.00000e+000 | A 4 = 1.02317e−005 | A 6 = −5.45429e−008 |
| A 8 = −1.79351e−010 | A10 = −8.19774e−013 | A12 = −9.61042e−016 |

| VARIOUS DATA | |
|---|---|
| Focal Length: | 20.50 |
| FNO: | 1.85 |

-continued

| UNIT: mm | | |
|---|---|---|
| Half Angle of View (°): | 46.5 | |
| Image Height: | 18.60 | |
| Overall Optical Length: | 84.95 | |
| BF | 11.52 | |
| | Infinity | Short Distance |
| d4 | 14.19 | 13.54 |
| d17 | 1.50 | 12.50 |

| Lens Unit Data | | |
|---|---|---|
| Lens Unit | Starting Surface | Focal Length: |
| FL1 | 1 | −28.94 |
| FL2 | 5 | 28.89 |
| RL | 18 | −160.42 |

| Single Lens Data | | |
|---|---|---|
| Lens | Starting Surface | Focal Length: |
| 1 | 1 | −54.59 |
| 2 | 3 | −70.57 |
| 3 | 5 | 19.64 |
| 4 | 6 | −57.17 |
| 5 | 9 | 104.66 |
| 6 | 11 | −14.04 |
| 7 | 12 | 35.25 |
| 8 | 14 | 62.01 |
| 9 | 16 | 31.15 |
| 10 | 18 | 139.00 |
| 11 | 20 | −69.70 |

Numerical Example 5

| UNIT: mm | | | | |
|---|---|---|---|---|
| Surface Data | | | | |
| Surface Number | r | d | nd | vd | Effective Diameter |
| 1 | 264.891 | 1.57 | 1.51742 | 52.4 | 32.60 |
| 2 | 15.736 | 14.57 | | | 25.06 |
| 3 | 29.703 | 3.45 | 1.90366 | 31.3 | 20.67 |
| 4 | −1467.268 | 0.16 | | | 20.50 |
| 5 | 51.003 | 5.35 | 1.80400 | 46.5 | 20.23 |
| 6 | −22.603 | 1.05 | 1.64769 | 33.8 | 19.59 |
| 7 | 43.603 | 4.03 | | | 17.74 |
| 8(Diaphragm) | ∞ | 2.26 | | | 16.32 |
| 9 | −281.459 | 1.68 | 1.72916 | 54.7 | 15.33 |
| 10 | −41.378 | 1.14 | | | 15.08 |
| 11 | −17.748 | 1.00 | 1.85478 | 24.8 | 14.94 |
| 12 | 27.023 | 3.30 | 1.49700 | 81.5 | 15.26 |
| 13 | −78.691 | 0.15 | | | 15.71 |
| 14 | 63.292 | 4.74 | 1.91082 | 35.3 | 18.21 |
| 15 | −25.839 | 0.15 | | | 19.59 |
| 16 | −44.636 | 2.10 | 1.53110 | 55.9 | 20.04 |
| 17* | −44.385 | (Variable) | | | 21.14 |
| 18 | −91.245 | 1.94 | 1.67790 | 55.3 | 25.80 |
| 19 | −46.955 | 10.30 | | | 26.25 |
| 20 | −23.866 | 1.57 | 1.51742 | 52.4 | 28.94 |
| 21 | −45.889 | 10.50 | | | 31.60 |
| Image Plane | ∞ | | | | |

| ASPHERIC DATA | | |
|---|---|---|
| 17th Surface | | |
| K = 0.00000e+000 | A 4 = 2.83931e−005 | A 6 = −5.17075e−008 |
| A 8 = 1.49551e−009 | A10 = −1.23012e−011 | A12 = 3.69169e−014 |

-continued

| UNIT: mm | | |
|---|---|---|
| VARIOUS DATA | | |
| Focal Length: | | 24.60 |
| FNO: | | 1.85 |
| Half Angle of View (°): | | 41.3 |
| Image Height: | | 19.32 |
| Overall Optical Length: | | 73.00 |
| BF | | 10.50 |
| | Infinity | Short Distance |
| d17 | 2.00 | 14.96 |
| Lens Unit Data | | |
| Lens Unit | Starting Surface | Focal Length: |
| FL | 1 | 25.25 |
| RL | 18 | −409.03 |
| Single Lens Data | | |
| Lens | Starting Surface | Focal Length: |
| 1 | 1 | −32.40 |
| 2 | 3 | 32.25 |
| 3 | 5 | 20.13 |
| 4 | 6 | −22.84 |
| 5 | 9 | 66.33 |
| 6 | 11 | −12.40 |
| 7 | 12 | 40.90 |
| 8 | 14 | 20.67 |
| 9 | 16 | 3810.00 |
| 10 | 18 | 140.21 |
| 11 | 20 | −98.50 |

Numerical Example 6

| UNIT: mm | | | | |
|---|---|---|---|---|
| Surface Data | | | | |
| Surface Number | r | d | nd | vd | Effective Diameter |
|---|---|---|---|---|---|
| 1 | 83.021 | 1.50 | 1.51633 | 64.1 | 33.00 |
| 2 | 18.741 | 3.88 | | | 26.63 |
| 3 | 43.536 | 1.50 | 1.48749 | 70.2 | 26.33 |
| 4 | 22.900 | 10.50 | | | 24.12 |
| 5 | 26.464 | 5.00 | 1.90043 | 37.4 | 20.26 |
| 6 | −129.459 | 2.04 | | | 19.88 |
| 7 | −120.297 | 4.88 | 1.83481 | 42.7 | 19.02 |
| 8 | −23.035 | 1.01 | 1.72825 | 28.5 | 18.51 |
| 9 | 201.055 | 1.70 | | | 17.82 |
| 10(Diaphragm) | ∞ | 4.54 | | | 17.34 |
| 11 | 59.005 | 1.51 | 1.80400 | 46.5 | 15.74 |
| 12 | 1194.251 | 3.16 | | | 15.44 |
| 13 | −19.019 | 1.05 | 1.85478 | 24.8 | 14.53 |
| 14 | 38.000 | 6.43 | 1.58313 | 59.4 | 21.00 |
| 15* | −27.217 | 0.15 | | | 21.84 |
| 16 | 80.132 | 5.24 | 1.91082 | 35.3 | 27.50 |
| 17 | −43.861 | (Variable) | | | 28.33 |
| 18 | −117.059 | 2.41 | 1.77250 | 49.6 | 29.26 |
| 19 | −49.631 | 10.50 | | | 29.57 |
| 20 | −23.346 | 1.50 | 1.51742 | 52.4 | 29.83 |
| 21 | −53.345 | (Variable) | | | 32.24 |
| Image Plane | ∞ | | | | |

| UNIT: mm | | |
|---|---|---|
| ASPHERIC DATA | | |
| 15th Surface | | |
| K = 0.00000e+000 | A 4 = 1.37287e−005 | A 6 = 7.17992e−009 |
| A 8 = 3.79205e−010 | A10 = −1.27723e−012 | A12 = −3.75238e−016 |

| VARIOUS DATA | |
|---|---|
| Focal Length: | 24.72 |
| FNO: | 1.85 |
| Half Angle of View (°): | 41.2 |
| Image Height: | 19.54 |
| Overall Optical Length: | 81.00 |
| BF | 11.01 |

|  | Infinity | Short Distance |
|---|---|---|
| d17 | 1.50 | 14.93 |
| d21 | 11.01 | 15.41 |

| Lens Unit Data | | |
|---|---|---|
| Lens Unit | Starting Surface | Focal Length: |
| FL | 1 | 26.07 |
| RL | 18 | −460.55 |

| Single Lens Data | | |
|---|---|---|
| Lens | Starting Surface | Focal Length: |
| 1 | 1 | −47.25 |
| 2 | 3 | −101.52 |
| 3 | 5 | 24.78 |
| 4 | 7 | 33.37 |
| 5 | 8 | −28.32 |
| 6 | 11 | 77.16 |
| 7 | 13 | −14.70 |
| 8 | 14 | 28.22 |
| 9 | 16 | 31.76 |
| 10 | 18 | 109.83 |
| 11 | 20 | −81.63 |

TABLE 1 shows various values corresponding to the numerical examples.

TABLE 1

|  | Ex. 1 | Ex. 2 | Ex. 3 | Ex. 4 | Ex. 5 | Ex. 6 |
|---|---|---|---|---|---|---|
| f | 28.60 | 20.60 | 24.72 | 20.50 | 24.60 | 24.72 |
| fFL1 | −38.84 | −27.34 | −34.07 | −28.94 | −32.40 | −31.04 |
| fRL | −394.81 | −255.10 | −459.74 | −160.42 | −409.03 | −460.55 |
| x | 13.73 | 23.17 | 15.32 | 22.70 | 14.57 | 15.88 |
| BF | 13.20 | 11.00 | 11.00 | 11.52 | 10.50 | 11.01 |
| TTL | 81.00 | 84.87 | 81.00 | 84.95 | 73.00 | 81.00 |
| Ndp | 1.911 | 1.900 | 1.900 | 1.900 | 1.804 | 1.835 |
| Ndn | 1.728 | 1.800 | 1.728 | 1.800 | 1.648 | 1.728 |
| νdp | 81.50 | 81.50 | 81.50 | 81.50 | 81.50 | 59.40 |
| νdn | 24.80 | 24.80 | 24.80 | 24.80 | 24.80 | 24.80 |
| φmax | 33.52 | 39.00 | 33.46 | 39.00 | 32.60 | 33.00 |
| φf | 31.47 | 39.00 | 33.00 | 39.00 | 32.60 | 33.00 |
| φr | 33.52 | 31.31 | 33.46 | 31.58 | 31.60 | 32.24 |
| ω | 37.1 | 46.4 | 41.2 | 46.5 | 41.3 | 41.2 |
| fFL1/x | −2.829 | −1.180 | −2.224 | −1.275 | −2.224 | −1.955 |
| Nave | 1.516 | 1.487 | 1.516 | 1.487 | 1.517 | 1.501 |
| BF/f | 0.462 | 0.534 | 0.445 | 0.562 | 0.427 | 0.445 |
| x/TTL | 0.170 | 0.273 | 0.189 | 0.267 | 0.200 | 0.196 |
| Ndp-Ndn | 0.183 | 0.100 | 0.172 | 0.100 | 0.156 | 0.107 |
| νdp-νdn | 56.70 | 56.70 | 56.70 | 56.70 | 56.70 | 34.60 |
| φr/φmax | 1.000 | 0.803 | 1.000 | 0.810 | 0.959 | 0.977 |
| φf/φr | 0.939 | 1.246 | 0.986 | 1.235 | 1.032 | 1.024 |
| BF/TTL | 0.163 | 0.130 | 0.136 | 0.136 | 0.144 | 0.136 |
| fFL1/f | −1.358 | −1.327 | −1.378 | −1.412 | −1.317 | −1.256 |

TABLE 1-continued

|       | Ex. 1   | Ex. 2    | Ex. 3    | Ex. 4    | Ex. 5    | Ex. 6   |
|-------|---------|----------|----------|----------|----------|---------|
| fRL/f | −13.80  | −12.38   | −18.60   | −7.83    | −16.63   | −18.63  |
| V     | 0.301   | 0.384    | 0.382    | 0.407    | 0.348    | 0.343   |
| dist ω | −6.773 | −13.553  | −10.593  | −14.015  | −10.681  | −9.544  |

Image Pickup Apparatus

Figure 13:
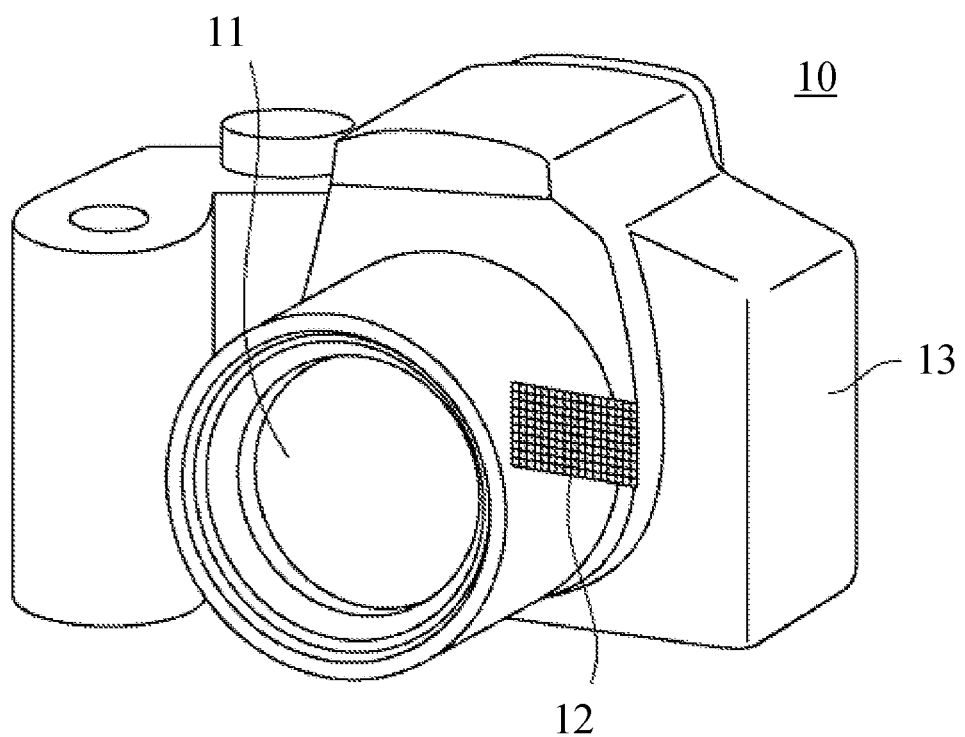
FIG. 13 is a schematic view of an image pickup apparatus.

Referring now to FIG. 13, a description will be given of an example of a digital still camera (image pickup apparatus) using the optical system according to the aspect of the embodiments as an imaging optical system. In FIG. 13, reference numeral 10 denotes a camera body, and reference numeral 11 denotes an imaging optical system including any of the optical systems L0 according to Examples 1 to 6. Reference numeral 12 denotes a solid state image sensor (photoelectric conversion element) such as a CCD sensor or a CMOS sensor, which is built in the camera body, receives an optical image formed by the imaging optical system 11, and performs a photoelectric conversion. The camera body 10 may be a so-called single-lens reflex camera having a quick turn mirror, or a so-called mirrorless camera having no quick turn mirror.

As described above, this example can provide an image pickup apparatus having a compact lens, such as a digital still camera, using the optical system L0 according to the aspect of the embodiments.

Image Pickup System

An image pickup system (surveillance camera system) may include the optical system L0 according to each example and a control unit (controller) that controls the optical system L0. In this case, the control unit can control the optical system L0 so that each lens unit moves as described above during focusing and image stabilization. At this time, the control unit does not have to be integrated with the optical system L0, and the control unit may be separate from the optical system L0. For example, a control unit (control device) distant from a driving unit (driver) that drives each lens in the optical system L0 may include a transmission unit (transmitter) that sends a control signal (command) for controlling the optical system L0. This control unit can remotely control the optical system L0.

When an operation unit such as a remote controller or a button for remotely controlling the optical system L0 is provided to the control unit, the optical system L0 can be controlled in response to a user's input to the operation unit. For example, the operation unit may include an infinity button and a short-distance button. In this case, the control unit may send a signal to the driving unit of the optical system L0 so that an in-focus object distance of the optical system L0 increases when the user presses the infinity button, and the in-focus object distance of the optical system L0 decreases when the user presses the short-distance button.

The image pickup system may include a display unit such as a liquid crystal panel that displays information (moving state) on the object distance of the optical system L0. The information on the object distance of the optical system L0 includes, for example, an imaging magnification (focus position) and a moving amount (moving state) of each lens unit. Then, the user can remotely control the optical system L0 via the operation unit while viewing the information on the object distance of the optical system L0 shown on the display unit. The display unit and the operation unit may be integrated with each other using, for example, a touch panel.

Each example can provide a compact optical system that has a high optical performance, and is easy to manufacture, and a lens apparatus and an image pickup apparatus each having the same.

While the disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-123366, filed on Jul. 20, 2020, which is hereby incorporated by reference herein in its entirety.

What is claimed is:

1. An optical system comprising, in order from an object side to an image side, a front unit having a positive refractive power and including one or more lens units configured to move during focusing, and a negative lens unit having a negative refractive power, the one or more lens units included in the front unit moving to the object side during focusing from infinity to a short distance so as to widen a distance between the front unit and the negative lens unit, wherein the front unit includes a first subunit having a negative refractive power and including a lens disposed on the object side of a first positive lens that is one of positive lenses included in the optical system, the first positive lens being closest to an object in the positive lenses, and wherein the following inequalities are satisfied:

$$-4.00 < fFL1/x < -0.95$$

$$1.40 < Nave < 1.65$$

$$0.25 < BF/f < 0.95$$

$$0.13 < x/TTL < 0.35$$

where f is a focal length of the optical system in an in-focus state at infinity, fFL1 is a focal length of the first subunit, Nave is an average refractive index of the first subunit, x is a distance on an optical axis from a surface on the image side of a lens closest to the object in the optical system in the in-focus state at infinity to a surface on the object side of the first positive lens, TTL is a distance on the optical axis from a lens surface closest to the object in the optical system in the in-focus state at infinity to an image plane, and BF is a backfocus of the optical system in the in-focus state at infinity.

2. The optical system according to claim 1, wherein the front unit includes a diaphragm disposed on the image side of the first positive lens.

3. The optical system according to claim 1, wherein the front unit includes, in order from the object side to the image side, a first cemented lens, a diaphragm, and a second cemented lens.

4. The optical system according to claim 3, wherein the following inequality is satisfied:

$$0.07 < Ndp - Ndn < 0.25$$

where Ndp is a maximum refractive index of a positive lens included in the first cemented lens, and Ndn is a minimum refractive index of a negative lens included in the first cemented lens.

5. The optical system according to claim 3, wherein the following inequality is satisfied:

$$25 < vdp - vdn < 70$$

where vdp is a maximum Abbe number of a positive lens included in the second cemented lens, and vdn is a minimum Abbe number of a negative lens included in the second cemented lens.

6. The optical system according to claim 1, wherein the front unit includes at least one aspherical lens on the image side of the first subunit.

7. The optical system according to claim 1, wherein the negative lens unit has a positive lens and a negative lens.

8. The optical system according to claim 1, wherein the following inequality is satisfied:

$$0.63 < \varphi r / \varphi max \leq 1.00$$

where $\varphi r$ a maximum effective diameter of the lens closest to an image plane in the optical system, and $\varphi max$ is a maximum effective diameter of lenses included in the optical system.

9. The optical system according to claim 1, wherein the following inequality is satisfied:

$$0.7 < \varphi f / \varphi r < 1.3$$

where $\varphi f$ is a maximum effective diameter of the lens closest to the object in the optical system, and $\varphi r$ is a maximum effective diameter of a lens closest to an image plane in the optical system.

10. The optical system according to claim 1, wherein the following inequality is satisfied:

$$0.06 < BF/TTL < 0.35.$$

11. The optical system according to claim 1, wherein the following inequality is satisfied:

$$-2.0 < fFL1/f < -0.1.$$

12. The optical system according to claim 1, wherein the number of lenses included in the first subunit is two or less.

13. The optical system according to claim 1, wherein the first subunit and the first positive lens are separated by maximum air spacing in the front unit.

14. The optical system according to claim 1, wherein the lens closest to the object in the first subunit is a negative meniscus lens with a concave surface facing an image plane.

15. The optical system according to claim 1, wherein the first positive lens has a convex lens surface on the object side.

16. The optical system according to claim 1, wherein the following inequality is satisfied:

$$-22 < fRL/f < -5$$

where fRL is a focal length of the negative lens unit.

17. The optical system according to claim 1, wherein the following inequality is satisfied:

$$0.2 < V < 0.6$$

where V is a third-order distortion coefficient of the optical system in the in-focus state at infinity.

18. The optical system according to claim 1, wherein the following inequality is satisfied:

$$-20 < dist(\omega) < -5$$

where $\omega$ is a maximum imaging half angle of view of the optical system in the in-focus state at infinity, and $dist(\omega)$ is a distortion amount of the optical system in the in-focus state at infinity at the maximum imaging half angle of view.

19. A lens apparatus comprising:
an optical system; and
a memory configured to store information on a distortion amount of an image formed by the optical system,
wherein the optical system includes, in order from an object side to an image side, a front unit having a positive refractive power and including one or more lens units configured to move during focusing, and a negative lens unit having a negative refractive power, the one or more lens units included in the front unit moving to the object side during focusing from infinity to a short distance so as to widen a distance between the front unit and the negative lens unit,
wherein the front unit includes a first subunit having a negative refractive power and including a lens disposed on the object side of a first positive lens that is one of positive lenses included in the optical system, which is the closest to an object, and
wherein the following inequalities are satisfied:

$$-4.00 < fFL1/x < -0.95$$

$$1.40 < Nave < 1.65$$

$$0.25 < BF/f < 0.95$$

$$0.13 < x/TTL < 0.35$$

where f is a focal length of the optical system in an in-focus state at infinity, fFL1 is a focal length of the first subunit, Nave is an average refractive index of the first subunit, x is a distance on an optical axis from a surface on the image side of a lens closest to the object in the optical system in the in-focus state at infinity to a surface on the object side of the first positive lens, TTL is a distance on the optical axis from a lens surface closest to the object in the optical system in the in-focus state at infinity to an image plane, and BF is a backfocus of the optical system in the in-focus state at infinity.

20. An image pickup apparatus comprising:
an optical system; and
an image sensor configured to receive light of an image formed by the optical system,
wherein the optical system includes, in order from an object side to an image side, a front unit having a positive refractive power and including one or more lens units configured to move during focusing, and a negative lens unit having a negative refractive power, the one or more lens units included in the front unit moving to the object side during focusing from infinity to a short distance so as to widen a distance between the front unit and the negative lens unit,
wherein the front unit includes a first subunit having a negative refractive power and including a lens disposed on the object side of a first positive lens that is one of positive lenses included in the optical system, the first positive lens being closest to an object in the positive lenses, and wherein the following inequalities are satisfied:

$-4.00 < fFL1/x < -0.95$ $1.40 < Nave < 1.65$ $0.25 < BF/f < 0.95$ $0.13 < x/TTL < 0.35$ where f is a focal length of the optical system in an in-focus state at infinity, fFL1 is a focal length of the first subunit, Nave is an average refractive index of the first subunit, x is a distance on an optical axis from a surface on the image side of a lens closest to the object in the optical system in the in-focus state at infinity to a surface on the object side of the first positive lens, TTL is a distance on the optical axis from a lens surface closest to the object in the optical system in the in-focus state at infinity to an image plane, and BF is a backfocus of the optical system in the in-focus state at infinity.

* * * * *